United States Patent
Ebihara et al.

(10) Patent No.: US 8,873,045 B2
(45) Date of Patent: Oct. 28, 2014

(54) SPECTROCOLORIMETER AND IMAGE FORMING APPARATUS

(75) Inventors: Shun-ichi Ebihara, Suntou-gun (JP); Hiroshi Kita, Mishima (JP); Ken Yokoyama, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 13/551,156

(22) Filed: Jul. 17, 2012

(65) Prior Publication Data

US 2013/0038867 A1    Feb. 14, 2013

(30) Foreign Application Priority Data

Aug. 11, 2011   (JP) .................................. 2011-176332

(51) Int. Cl.
*G01J 3/28* (2006.01)
*G01J 3/50* (2006.01)
*G01J 3/52* (2006.01)

(52) U.S. Cl.
CPC .................. *G01J 3/502* (2013.01); *G01J 3/524* (2013.01); *G01J 2003/2866* (2013.01)
USPC ......................................................... 356/326

(58) Field of Classification Search
USPC .................................. 356/300, 326, 328, 334
See application file for complete search history.

(56) References Cited

U.S. PATENT DOCUMENTS

| | | | |
|---|---|---|---|
| 5,771,094 A | * | 6/1998 | Carter et al. .................. 356/326 |
| 7,269,369 B2 | | 9/2007 | Tezuka et al. |
| 7,982,908 B2 | | 7/2011 | Kita et al. |
| 2011/0217052 A1 | | 9/2011 | Usui et al. |

FOREIGN PATENT DOCUMENTS

JP    2003-114187    4/2003

OTHER PUBLICATIONS

U.S. Appl. No. 13/523,807, filed Jun. 14, 2012 by Shun-ichi Ebihara et al.
U.S. Appl. No. 13/528,597, filed Jun. 20, 2012 by Hiroshi Kita et al.

* cited by examiner

*Primary Examiner* — Abdullahi Nur
(74) *Attorney, Agent, or Firm* — Fitzpatrick, Cella, Harper & Scinto

(57) ABSTRACT

A spectrocolorimeter comprises: a calculation unit configured to calculate wavelengths of dispersing light rays respectively received by a plurality of pixels included in a light detection unit using a correspondence relationship between pixels and wavelengths of a plurality of extremal value points in a profile of dispersing light rays detected by the light detection unit upon execution of colorimetry of a reference object to be measured, wherein when the calculation unit calculates the wavelengths of the dispersing light rays respectively received by the plurality of pixels, the calculation unit adjusts a colorimetry condition for respective extremal value points so that signals to be output from pixels corresponding to the plurality of extremal value points have output levels which are not less than a reference and are not saturated.

23 Claims, 19 Drawing Sheets

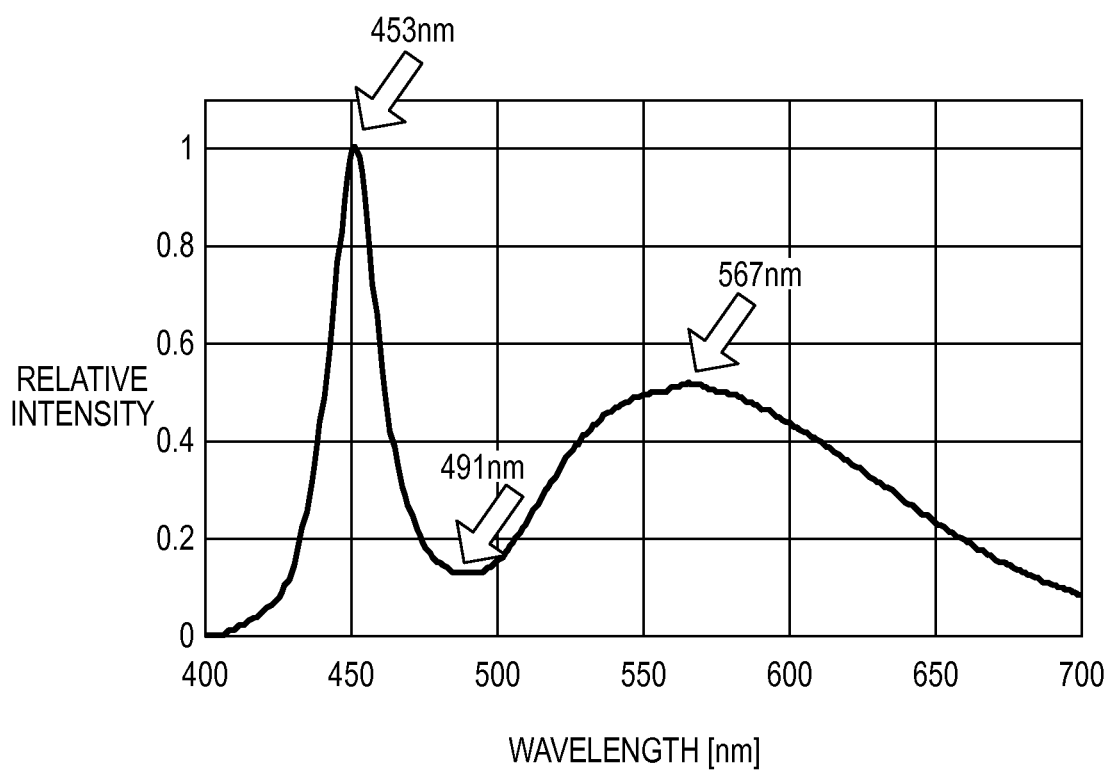
F I G. 2

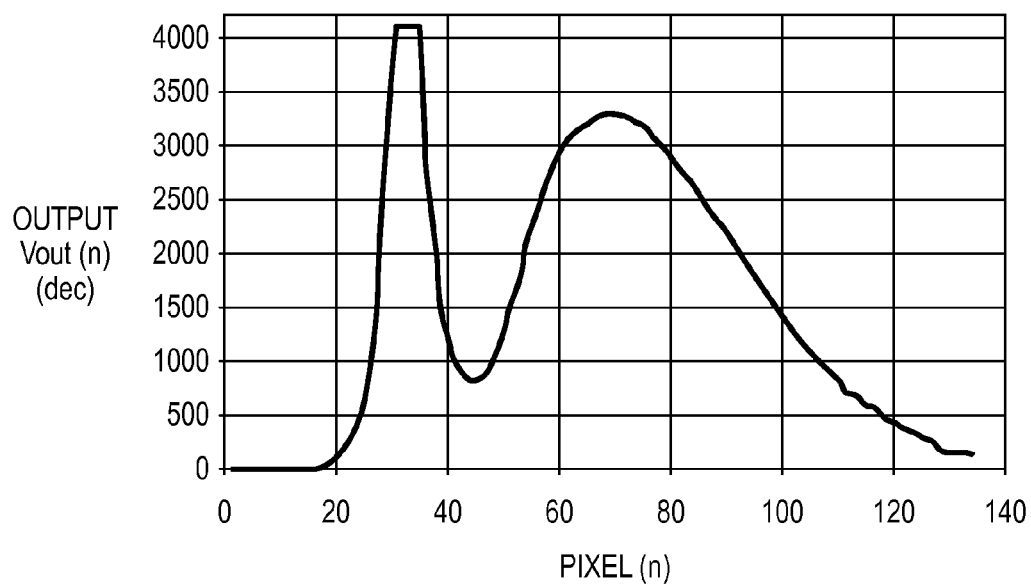
F I G. 5A
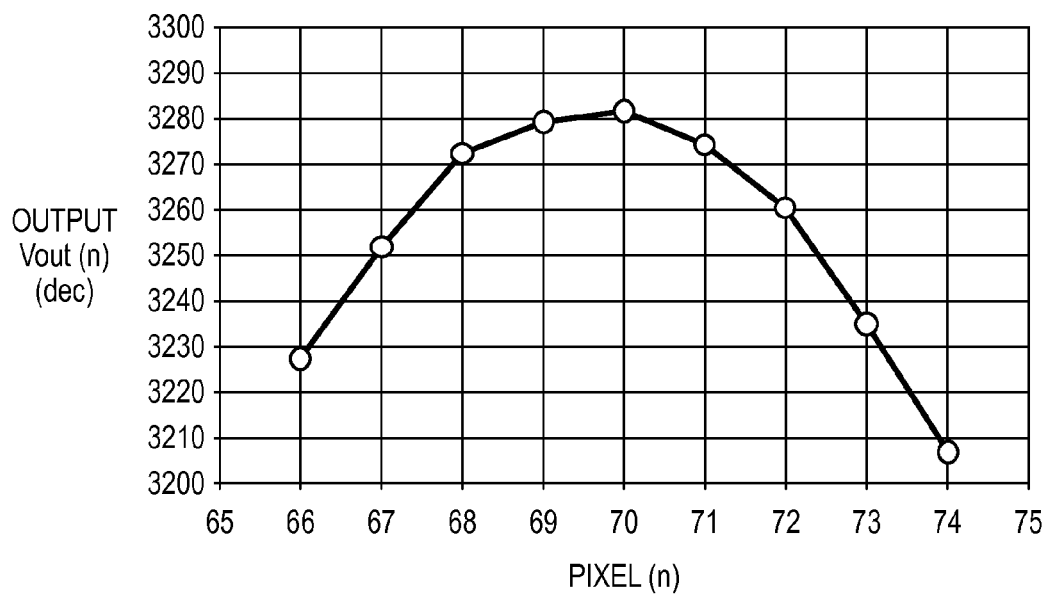
F I G. 5B

F I G. 15
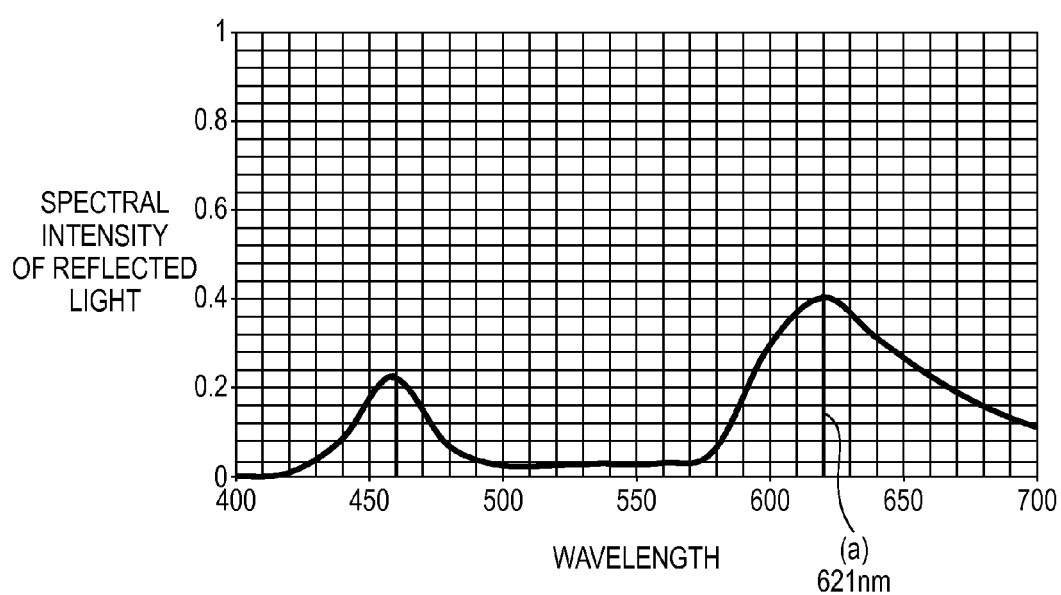

F I G. 18
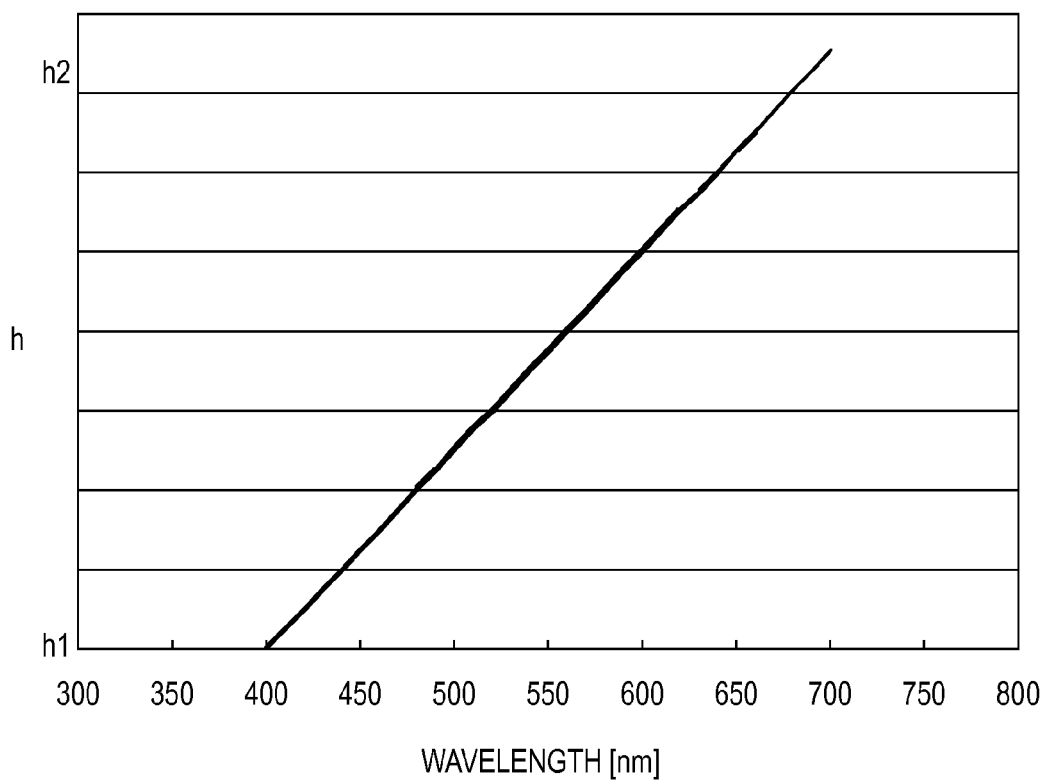

FIG. 19

| PIXEL POSITION | WAVELENGTH |
|---|---|
| 1 | |
| 2 | |
| 3 | 327.6 |
| 4 | 330.6 |
| 5 | 333.7 |
| 6 | 336.7 |
| 7 | 339.8 |
| 8 | 342.8 |
| 9 | 345.9 |
| ⋮ | ⋮ |
| 43 | 449.8 |
| 44 | 452.9 |
| 45 | 455.9 |
| 46 | 459 |
| 47 | 462.0 |
| 48 | 465.1 |
| 49 | 468.1 |
| ⋮ | ⋮ |
| 96 | 611.8 |
| 97 | 614.8 |
| 98 | 617.9 |
| 99 | 621 |
| 100 | 624.0 |
| 101 | 627.1 |
| 102 | 630.1 |
| ⋮ | ⋮ |
| 136 | 734.0 |
| 137 | 737.1 |
| 138 | 740.1 |
| 139 | |
| 140 | |

SPECTROCOLORIMETER AND IMAGE FORMING APPARATUS

BACKGROUND OF THE INVENTION

1. Field of the Invention

The present invention relates to a colorimetry method of an image output by a copying machine, printer, or the like of an ink-jet system, electrophotography system, or the like.

2. Description of the Related Art

Conventionally, a spectrocolorimeter (color sensor) is used as an apparatus for measuring colors of printed products and objects. The spectrocolorimeter irradiates the object to be measured with white light, and detects, using a line sensor, intensities of dispersing light rays after reflected light is diverged for respective wavelengths using a diffraction grating or prism. Then the spectrocolorimeter calculates spectral reflectances of the object to be measured by making calculations in consideration of a wavelength distribution of the detected dispersing light intensities, that of light of a light source, a spectral sensitivity of the sensor, and the like. In this case, since an amount of light entering the object to be measured is not uniform over the full wavelength range of visible light, the intensities of incident light rays for respective wavelengths are required to be calculated so as to calculate the spectral reflectances of the object to be measured, and the wavelength distribution of light rays entering respective pixels of the line sensor is required to be calculated.

However, the relationship between the respective pixels of the line sensor and wavelengths which are value-set on these pixels deviates due to aging or thermal changes. Note that "value-setting" indicates to associate them with each other. For this reason, in order to correctly measure the wavelength distribution of reflected light and to attain correction based on the intensity distribution of incident light, the wavelengths which are value-set on the respective pixels of the line sensor have to be appropriately calibrated.

To solve the above problem, Japanese Patent Laid-Open No. 2003-114187 has proposed the following method. That is, for a line sensor on which light-receiving elements (pixels) for colorimetry are arranged in a line, pixels of the sensor are arranged to be more than the minimum required number. Furthermore, a filter for absorbing light rays of wavelengths other than visible light is arranged between a spectral optical element and the sensor, or a light-emitting element which emits light of a predetermined wavelength is added, thereby specifying wavelengths of light rays which enter the respective pixels of the sensor. According to this method, since the wavelengths of light rays which enter the respective pixels of the sensor are specified, the need for precise components and strict management and adjustment of positional precision can be obviated, thus allowing detection of the spectral reflectances of toner patches with low cost.

However, the method proposed by Japanese Patent Laid-Open No. 2003-114187 additionally requires light absorbing unit (filter) and is disadvantageous in terms of cost. Alternatively, depending on a filter to be used, visible light is attenuated, thus lowering colorimetry precision.

SUMMARY OF THE INVENTION

The present invention solves at least one of these problems and other problems. The present invention provides, for example, a mechanism which is advantageous in terms of cost upon specifying wavelengths of light rays which enter respective pixels of a sensor. Also, the present invention provides, for example, a mechanism which can easily improve colorimetry precision.

According to one aspect of the present invention, there is provided a spectrocolorimeter comprising: a light source configured to irradiate an object to be measured with colorimetry light; a spectral unit configured to spectrally separate reflected light from the object to be measured; a light detection unit having a plurality of pixels configured to receive dispersing light rays spectrally separated by the spectral unit, and to output signals according to intensities of the dispersing light rays; and a calculation unit configured to calculate wavelengths of the dispersing light rays respectively received by the plurality of pixels included in the light detection unit using a correspondence relationship between pixels and wavelengths of a plurality of extremal value points in a profile of dispersing light rays detected by the light detection unit upon execution of colorimetry of a reference object to be measured, wherein when the calculation unit calculates the wavelengths of the dispersing light rays respectively received by the plurality of pixels, the calculation unit adjusts a colorimetry condition for respective extremal value points so that signals to be output from pixels corresponding to the plurality of extremal value points have output levels which are not less than a reference and are not saturated.

According to another aspect of the present invention, there is provided an image forming apparatus which forms an image on a printing medium using a color material, comprising: a light source configured to irradiate an object to be measured with colorimetry light; a spectral unit configured to spectrally separate reflected light from the object to be measured; a light detection unit having a plurality of pixels configured to receive dispersing light rays spectrally separated by the spectral unit, and to output signals according to intensities of the dispersing light rays; and a correction unit configured to correct a correspondence relationship between the pixels and the wavelengths of the dispersing light rays received by the light detection unit using a correspondence relationship between wavelengths and pixels in a profile of dispersing light rays detected by the light detection unit upon execution of colorimetry of a reference object to be measured, and a correspondence relationship between pixels and wavelengths of dispersing light rays of the image formed on the printing medium.

The present invention provides, for example, a mechanism which is advantageous in terms of cost and which can easily improve colorimetry precision upon specifying wavelengths of light rays which enter respective pixels of a sensor.

Further features of the present invention will become apparent from the following description of exemplary embodiments (with reference to the attached drawings).

BRIEF DESCRIPTION OF THE DRAWINGS

FIG. 2 is a graph showing a white reference sample measurement spectrum, which is measured in advance by the spectrocolorimeter;

FIGS. 5A and 5B are graphs showing measured white reference sample measurement spectra;

FIG. 15 is a graph showing a spectral characteristic of reflected light obtained when a magenta patch is projected by the white LED;

FIG. 18 is a graph showing the relationship between spectral wavelengths of a chromaticity sensor and projected positions;

FIG. 19 shows tables showing the correspondence relationship between respective pixels of the line sensor and wavelengths.

DESCRIPTION OF THE EMBODIMENTS

Embodiments for carrying out the present invention will be described hereinafter with reference to the drawings. Note that the arrangement described in the embodiments is an example, and the present invention is not limited to this. As the arrangement of the present specification, a description of a spectrocolorimeter will be given in the first and second embodiments. Furthermore, a description about embodiments of wavelength correction in an image forming apparatus which includes a spectrocolorimeter will be given in the third and fourth embodiments.

First Embodiment

Figure 1A:
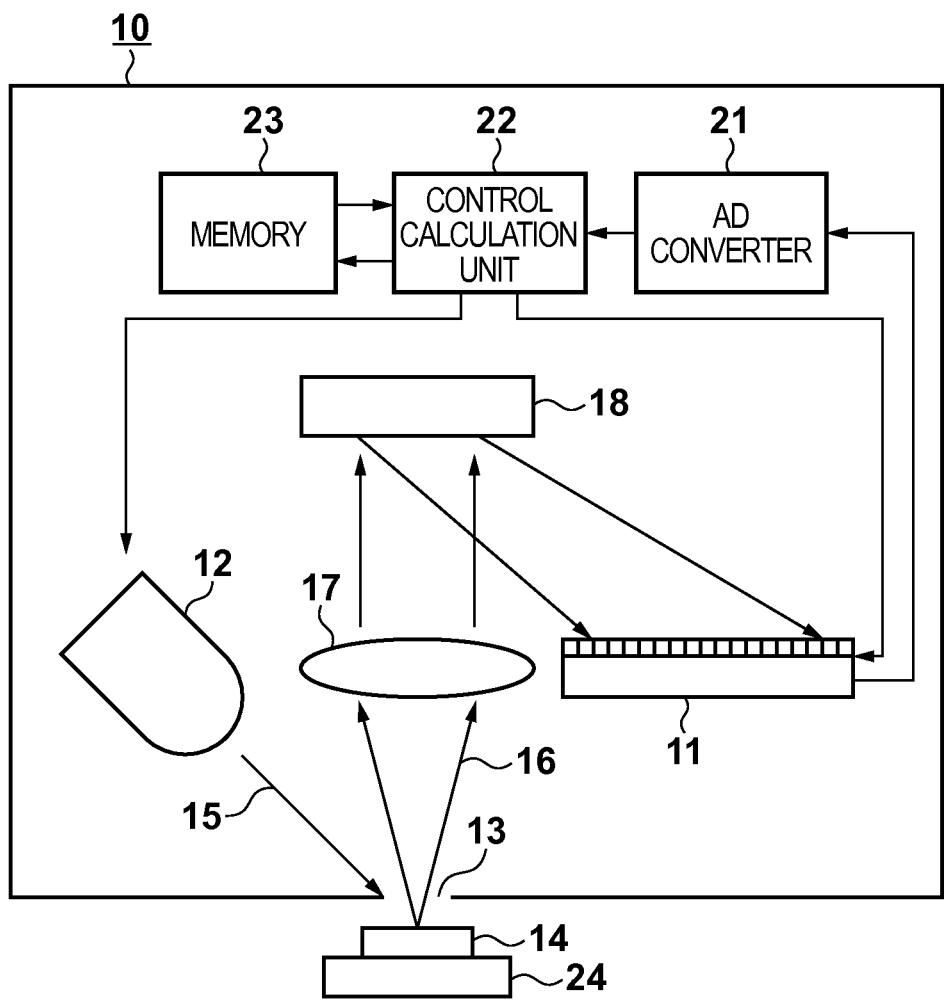
FIGS. 1A and 1B are schematic views showing an embodiment of a spectrocolorimeter.
Figure 1B:
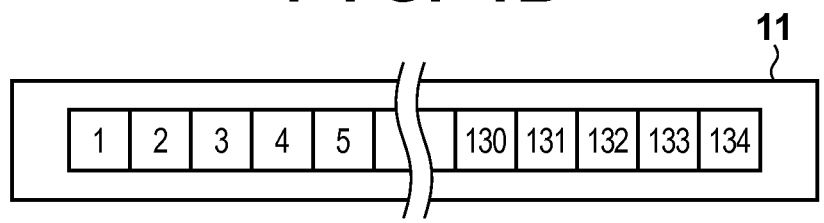

FIGS. 1A and 1B are schematic views of a spectrocolorimeter used in this embodiment. A spectrocolorimeter 10 shown in FIG. 1A includes a white light source 12 having an emission wavelength distribution over an entire visible light range, a condenser lens 17, a diffraction grating 18, and a charge accumulation type line sensor 11. The spectrocolorimeter 10 further includes an AD converter 21, control calculation unit 22, and memory 23. The control calculation unit 22 also controls peripheral devices (the line sensor 11, AD converter 21, memory 23, and white light source 12) in addition to various calculations.

In this embodiment, as the white light source 12, for example, a tungsten light source, white LED, 3-color LED of RGB (red, green, and blue), and the like can be used. In this embodiment, as the white light source 12, a white LED prepared by packaging an LED element which emits blue light in a resin mixed with a yellow phosphor is used. In this case, a peak around a wavelength of 460 nm corresponds to an emission spectrum of the blue LED, and a peak around 590 nm corresponds to a spectrum of the yellow phosphor. This spectrum results from light generated when the phosphor produces fluorescence upon reception of light from the LED element. An amount of light to be emitted by the white light source 12 can be adjusted as needed by an operation of the control calculation unit 22. In this embodiment, assume that a peak corresponding to an emission spectrum of the blue LED is 453 nm, and a spectrum of the yellow phosphor is 567 nm, as shown in FIG. 2. FIG. 1A illustrates an object 14 to be measured and a white reference 24 as a white board as objects to be irradiated with light from the white light source 12.

FIG. 1B shows the line sensor 11 included in the spectrocolorimeter 10 in detail, and shows the arrangement in which 134 pixels are arranged in a line. In this embodiment, assume that pixel numbers shown in FIG. 1B are used as addresses of respective pixels. Light 15 emitted from the white light source 12 passes through an opening 13, enters the object 14 to be measured formed on a transfer material at an angle of about 45°, and is converted into dispersing light according to a light absorption characteristic of the object 14 to be measured. Some rays of dispersing light 16 are fetched by the condenser lens 17 to be converted into parallel light rays, which enter the diffraction grating 18 at an incident angle of 90° and are spectrally separated. The spectrally separated dispersing light rays enter the line sensor 11.

As shown in FIG. 1B, in this embodiment, the line sensor 11 has 134 pixels required to detect visible light rays having wavelengths falling within a range from about 350 nm to about 750 nm at 3-nm intervals. Note that the line sensor 11 may have error correction pixels and dark pixels for dark output correction at end portions so as to improve symmetry of effective pixels and reduce inter-element variations. However, such pixels are omitted for the sake of simplicity. The line sensor 11 outputs voltage signals for respective pixels in accordance with the intensities of the incoming dispersing light rays. Then the signals output from the line sensor 11 are AD-converted by the AD converter 21, and reflected light rays from the object 14 to be measured can be obtained as digital intensity signals for respective pixels. The line sensor 11 used in this embodiment is a charge accumulation type line sensor, and outputs voltage signals for respective pixels according to the intensities of dispersing light rays entering for a predetermined accumulation time period. The accumulation time period of the line sensor 11 can be adjusted as needed by an operation of the control calculation unit 22.

The digital intensity signals output from the respective pixels are sent to the control calculation unit 22, and undergo the following calculations. Corresponding wavelengths $\lambda$ are value-set in advance on the respective pixels of the line sensor 11 by a method to be described later, and are held in the memory 23. For this reason, based on the values held in the memory 23, a wavelength-signal intensity spectrum $Oi(\lambda)$ of the reflected light rays from the object 14 to be measured can be obtained. Spectral reflectances $Or(\lambda)$ of the object 14 to be measured are calculated by:

$$Or(\lambda) = \{Oi(\lambda)/Wi(\lambda)\} \times Wr(\lambda) \quad (1)$$

In this calculation, a wavelength-signal intensity spectrum $Wi(\lambda)$ of reflected light rays obtained when a reference sample (in general, a white reference sample) whose spectral reflectances to be separately measured are given is irradiated with light coming from the white light source 12, and spectral reflectances $Wr(\lambda)$ of the reference sample are used. Assume that the spectral reflectances $Wr(\lambda)$ are given.

Furthermore, the control calculation unit 22 interpolates spectral reflectances within the range from 380 nm to 730 nm at 10-nm intervals based on the obtained spectral reflectance reflectances Or(λ), and externally outputs them.

FIG. 2 shows a wavelength-signal intensity spectrum obtained when a white reference sample (white reference 24) is measured as the object to be measured using the spectrocolorimeter 10 according to this embodiment, and shows a graph normalized to have "1" as a maximum intensity. In order to obtain the wavelength-signal intensity spectrum of the white reference sample, the relationship between the pixel positions of the line sensor 11 and the wavelengths λ has to be naturally value-set in advance (that is, they have to be associated with each other). This value-setting operation can be attained by a conventionally known method using, for example, a reference single wavelength spectrum of a given wavelength at a time of shipment of the line sensor 11. In this embodiment, upon obtaining the spectrum shown in FIG. 2, the relationship between the pixels of the line sensor 11 and the wavelengths λ was associated with each other using a monochrometer (CMS-100) available from Asahi Spectra. However, the relationship between the pixels of the line sensor 11 and the wavelengths λ which were value-set at the time of shipment changes under the influence of aging, heat, stress, and the like, as described above. Hence, when the user uses the spectrocolorimeter, he or she has to value-set that relationship.

[Wavelength Re-Value-Setting Method]

Figure 3:
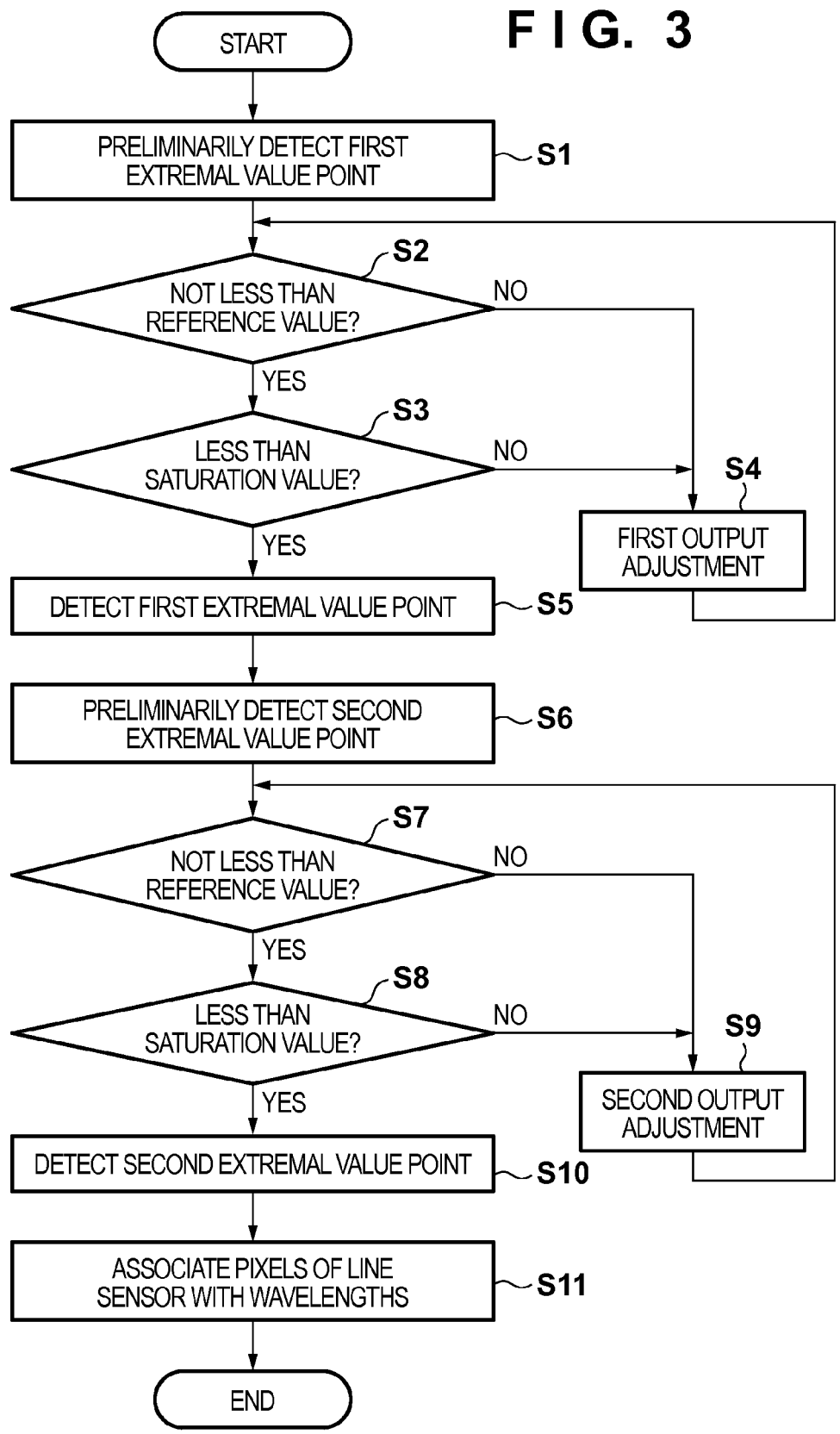
FIG. 3 is a flowchart according to the first embodiment.

The practical sequence of the re-value-setting method of the wavelengths λ corresponding to the respective pixels of the line sensor 11 in this embodiment will be described below with reference to the flowchart shown in FIG. 3. This processing is executed by the spectrocolorimeter 10. In this case, the memory 23 shown in FIG. 1A records in advance, as a dispersing light profile, wavelengths of 453 nm and 567 nm of local maximum value points as extremal value points of a spectrum upon measuring the white reference sample (white reference 24) shown in FIG. 2. The dispersing light profile in this case represents information of an optical characteristic indicating spectral reflectances of light rays diverged to respective wavelengths or reflection intensities of light rays diverged to respective wavelengths under a certain condition. As for intensities of light rays diverged to respective wavelengths, ratios when the strongest light intensity of a wavelength is "1" may be used as the dispersing light profile. The profile used in this embodiment may hold, for example, correspondence relationship values between all the wavelengths and optical characteristics. Also, as shown in FIG. 2, only values of extremal value points may be held in a storage unit. The profile may have different contents in consideration of use purposes, a data size to be held in a memory, and the like.

The spectrocolorimeter 10 executes preliminary detection of a first extremal value point in step S1. This preliminary detection confirms if a maximum value of the sensor output is equal to or smaller than a saturation value and is equal to larger than a reference value. In this case, the first extremal value point corresponds to a local maximum value point of the wavelength of 453 nm in the example of FIG. 2.

Details of the processing in step S1 will be described below. The control calculation unit 22 resets signals obtained by accumulating, for a predetermined time period, optical voltage outputs from the respective pixels of the charge accumulation type line sensor 11 shown in FIG. 1B. After that, the spectrocolorimeter 10 irradiates the white reference 24 with light coming from the white LED 12 as a light source, and diverges reflected light from the white reference 24 for respective wavelengths using the diffraction grating 18.

Then, dispersing light rays of the respective wavelengths enter the line sensor 11, which acquires signals by accumulating optical voltage outputs generated in response to the incoming light for a predetermined time period. The spectrocolorimeter 10 AD-converts the acquired signals using the AD converter 21, and sends digital signals to the control calculation unit 22. The spectrocolorimeter 10 extracts a maximum output value from the signals of the respective pixels using the control calculation unit 22.

The control calculation unit 22 then determines in steps S2 and S3 whether or not the extracted maximum output value is equal to or smaller than the saturation value and is equal to or larger than the reference value. The saturation value and reference value used in these steps are defined in advance and are held in the memory 23.

If the maximum output value extracted in step S1 reaches the saturation value (NO in step S3) or if it is equal to or smaller than the reference value (NO in step S2), the control calculation unit 22 executes first output adjustment processing (S4). That is, in order to attain a predetermined output level, the control calculation unit 22 adjusts an emission output of the white LED 12 so that the extracted maximum output value satisfies [reference value≤maximum output value<saturation value]. More specifically, the control calculation unit 22 controls the emission output of the white LED 12 while monitoring AD conversion signals which are received as needed, and adjusts a colorimetry condition so as to attain a proper output which satisfies the aforementioned condition. At this time, when the output value is less than the reference value, the spectrocolorimeter 10 controls to raise the output of the white LED 12 using the control calculation unit 22. When the output value exceeds the saturation value, the control calculation unit 22 adjusts control so as to reduce the emission output of the white LED 12. In this embodiment, the AD converter 21 operates in 12 bits, and 4095 (dec) correspond to the saturation value. As a signal output, it suffices to obtain a value about ¾ of the saturation value, and the emission output of the white LED 12 is adjusted to have 3000 (dec) as the reference value. Note that "dec" is short for "decimal".

After the emission output of the white LED 12 is properly adjusted (YES in steps S2 and S3), the spectrocolorimeter 10 then detects a first extremal value point in step S5. Optical voltage outputs, which are output from the respective pixels after the emission output adjustment of the white LED 12, are AD-converted, and digital signals are sent to the control calculation unit 22. The control calculation unit 22 extracts a maximum output value from the signals of the respective pixels again, and specifies a pixel having the maximum output value. If YES is determined in both steps S2 and S3 in the first processing, a sensor output value, which is preliminarily extracted in step S1, is adopted by the control calculation unit 22.

Figure 4:
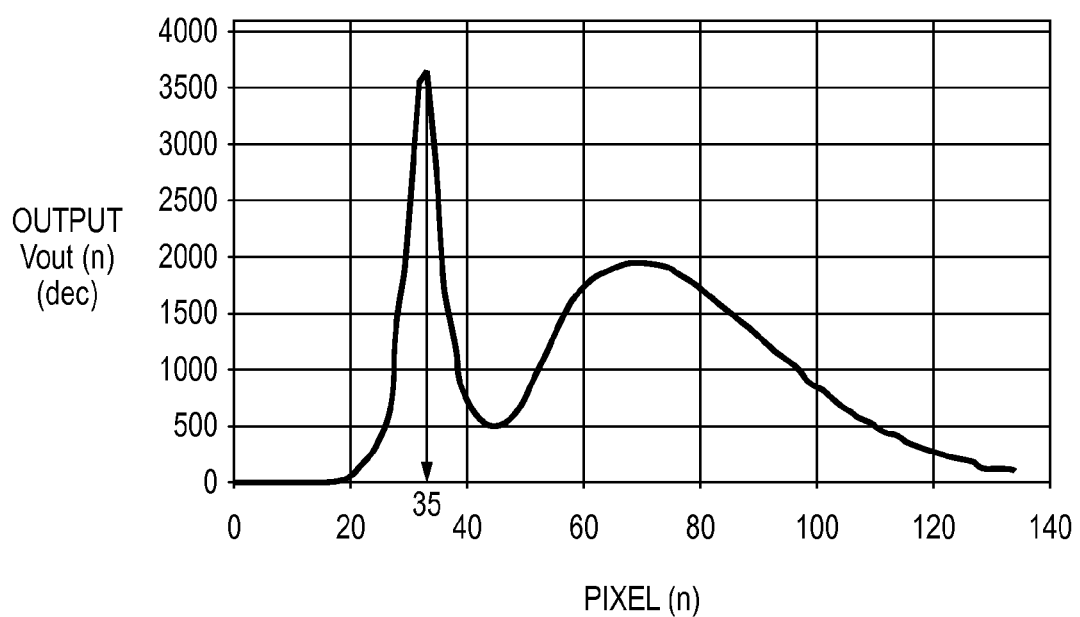
FIG. 4 is a graph showing a measured white reference sample measurement spectrum.

FIG. 4 shows an example of signals which are sent to the control calculation unit 22 with or without going through step S4. An output Vout(35) at an address "35" as a pixel position exhibits a local maximum value. On the other hand, the memory 23 pre-stores wavelength information of a local maximum value point of a spectrum obtained upon measuring the white reference 24, as shown in FIG. 2. The pre-stored characteristic of the dispersing light based on the white reference 24 is used as a dispersing light profile. For this reason, the control calculation unit 22 specifies a pixel at the address "35" as that which receives light of a wavelength of 453 nm by comparing the wavelength information and signal.

Next, in step S6, the spectrocolorimeter 10 preliminarily detects a second extremal value point. As in step S1, this preliminary detection confirms if a maximum value of the sensor outputs is equal to or smaller than the saturation value and is equal to or larger than the reference value. In this case, the second extremal value point corresponds to a local maximum value point of a wavelength of 567 nm in the example shown in FIG. 2. The control calculation unit 22 confirms an output value of a pixel at an address "69" which exhibits the other local maximum value. In this embodiment, this output value is 1925 (dec), but an output value at an address "70" as a pixel which neighbors the address "69" is 1924 (dec). In this case, an electric noise variation of a voltage output value of the line sensor 11 in this embodiment has ±1 (dec) as a value after AD conversion. Therefore, in consideration of the fact that these output values are influenced by electric noise variations, the pixel at the address "70" is likely to be a true second extremal value point in place of the pixel at the address "69". When the pixel of the extremal value point is erroneously decided, it causes larger errors in set wavelength values of other pixels in wavelength value-setting operations on the respective pixels (to be described later). Therefore, in order to determine the pixel of the second extremal value point, sufficient amount of electrical signal have to be obtained so that the influence of noise can be ignored.

Hence, in this embodiment, the control calculation unit 22 adjusts the emission output of the white LED 12 so that the pixel output value at the address "69", which exhibits the local maximum value, becomes equal to or larger than the aforementioned reference value and less than the saturation value while monitoring that pixel output. If the maximum output value extracted in step S6 reaches the saturation value (NO in step S8) or is equal to or smaller than the reference value (NO in step S7), the control calculation unit 22 executes second output adjustment processing (S9). In this case, the control calculation unit 22 controls so as to adjust the emission output voltage of the white LED 12 while monitoring AD conversion signals which are received as needed, so as to attain a proper output. This second output adjustment processing is controlled in the same manner as in step S4. In a spectrum obtained after the emission output adjustment of the white LED 12, the signal at the first extremal value point is saturated, as shown in FIG. 5A. However, since the operation in this step aims at deciding the pixel of the second extremal value point, signal saturation of the first extremal value point does not pose any problem.

After the emission output of the white LED 12 is properly adjusted (YES in steps S7 and S8), the spectrocolorimeter 10 then detects a second extremal value point in step S10. The spectrocolorimeter 10 confirms a local maximum value near an address "71" again using the control calculation unit 22. In the example of this embodiment, as a result of the processing, as shown in FIG. 5B, an output value at an address "69" is 3279 (dec), and that at an address "70" is 3282 (dec), so that outputs having a significant difference equal to or larger than an electric noise variation can be obtained. As a result, the address "70" is decided as an address which exhibits a local maximum value in place of the address "69". In this manner, a pixel at the address "70" can be specified as that which receives light of a wavelength of 567 nm.

Figure 6:
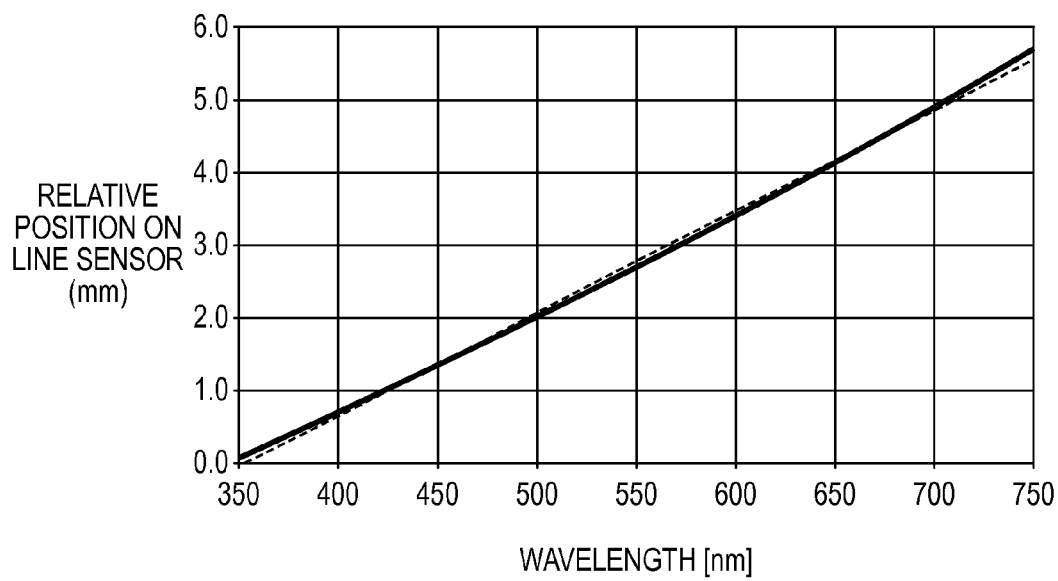
FIG. 6 is a graph showing the relationship between the wavelengths and relative positions on a line sensor in the spectrocolorimeter.
Figure 7:
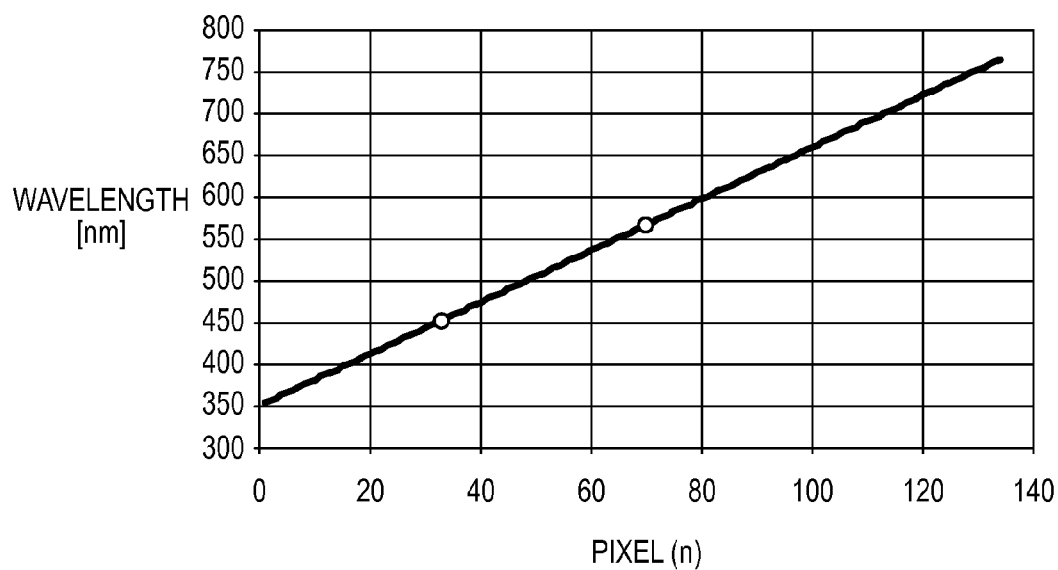
FIG. 7 is a graph showing the relationship between line sensor pixels and wavelengths according to the first embodiment.

After the second extremal value point is detected, the control calculation unit 22 specifies correspondence between the pixels of the line sensor 11 and wavelengths in step S11. In the arrangement of the spectrocolorimeter 10 of this embodiment, wavelengths and relative positions on the line sensor 11 have a nearly linear relationship, as indicated by the solid line in FIG. 6. Therefore, based on the correspondence relationship between two pairs of pixel positions and wavelengths, linear interpolation indicated by the broken line in FIG. 6 is made, thus allowing association of the wavelengths with the respective pixels. FIG. 7 shows the relationship between the respective pixels on the line sensor 11 and wavelengths, which are associated with each other by this correction method, based on the relationship between the addresses and wavelengths (address "35": 453 nm, address "70": 567 nm) obtained in steps S5 and S10. The spectrocolorimeter 10 controls the control calculation unit 22 to store these pieces of information in the memory 23, thus ending the re-value-setting operations.

With the aforementioned sequence, corresponding wavelengths $\lambda$ are value-set on the respective pixels of the line sensor 11. According to this embodiment, the wavelengths corresponding to local maximum values as two extremal value points upon reading the reflected spectrum from the white reference 24 by the line sensor 11 are stored in the memory 23. Thus, the value-setting operations of the wavelengths $\lambda$ corresponding to the respective pixels of the line sensor 11 can be executed at an arbitrary timing. Therefore, even when a frame body of the spectrocolorimeter 10 is deformed due to aging, heat, stress, and the like, and the position of dispersing light projected onto the line sensor 11 is shifted, the correspondence relationship between the respective pixels and wavelengths can be value-set again.

Then, upon execution of the value-setting operations, after optimal signal amounts are assured for two extremal value points, corresponding pixels are specified. For this reason, even in case of a spectrum shape whose position is hardly specified by a normal method (for example, a spectrum shape is broad like the second extremal value point (local maximum value) of this embodiment or a signal output level is low), the extremal value point can be precisely specified. Therefore, the need for light coming from an external calibration light source or addition of any calibration light source in the spectrocolorimeter can be obviated, and the precision of the spectrocolorimeter can be improved by an inexpensive, simple means.

With the above operations, association between the pixels of the line sensor 11 and the wavelengths $\lambda$ is complete. Upon execution of colorimetry of an object to be measured by the spectrocolorimeter 10 of this embodiment, the control calculation unit 22 replaces wavelengths $\lambda$ in equation (1) by pixel addresses n. Then, from output signals Oi(n) obtained upon measuring the white reference 24 in advance, and output signals Wi(n) obtained upon measuring the object to be measured, the control calculation unit 22 calculates Oi(n)/Wi(n) for the respective pixels. After that, the control calculation unit 22 reads out the correspondence relationship between the respective pixels of the line sensor 11 and the wavelengths, which are associated with each other by this correction method, from the memory 23, and obtains Oi($\lambda$)/Wi($\lambda$) by replacing the pixel addresses n by the wavelengths $\lambda$. Then, the control calculation unit 22 reads out the values of Wr($\lambda$) stored in the memory 23, thus obtaining spectral reflectances Or($\lambda$) of the object to be measured according to equation (1).

Note that in this embodiment, the value-setting operations of the wavelengths $\lambda$ corresponding to the respective pixels of the line sensor 11 are executed using reflected light from the white reference 24. When the wavelengths of the extremal value points are given, colorimetry light is not limited to white light, and arbitrary light can be used as a reference. In the example of this embodiment, reflected light is spectrally separated using the diffraction grating 18. However, the present invention is not limited to the diffraction grating, but it is applicable to a case in which a spectral unit such as a prism is used. In this embodiment, two local maximum values are used as the extremal value points. Alternatively, a larger number of local maximum values may be used as the extremal value points.

Second Embodiment

Since the arrangement of the spectrocolorimeter 10 used in this embodiment is the same as that described in the first embodiment, a detailed description of the arrangement will not be repeated. In the first embodiment, the value-setting operations of wavelengths λ corresponding to the respective pixels of the line sensor 11 are executed using linear interpolation based on the wavelengths of the two extremal value points of the spectrum observed by the line sensor 11.

By contrast, in this embodiment, for the purpose of further improvement of the precision of the spectrocolorimeter, the correspondence relationship between the pixels of the line sensor 11 and the wavelengths λ is more strictly value-set. More specifically, the pixel values to be value-set of the extremal value points are calculated to include decimal parts, and wavelength value-setting operations of pixels other than the extremal value points are made using a quadratic approximation formula. Furthermore, in place of an increase in signal amount by the output adjustment of the light source executed in the first embodiment, a received signal amount is increased by adjusting a light accumulation time for the line sensor.

[Wavelength Re-Value-Setting Method]

Figure 8:
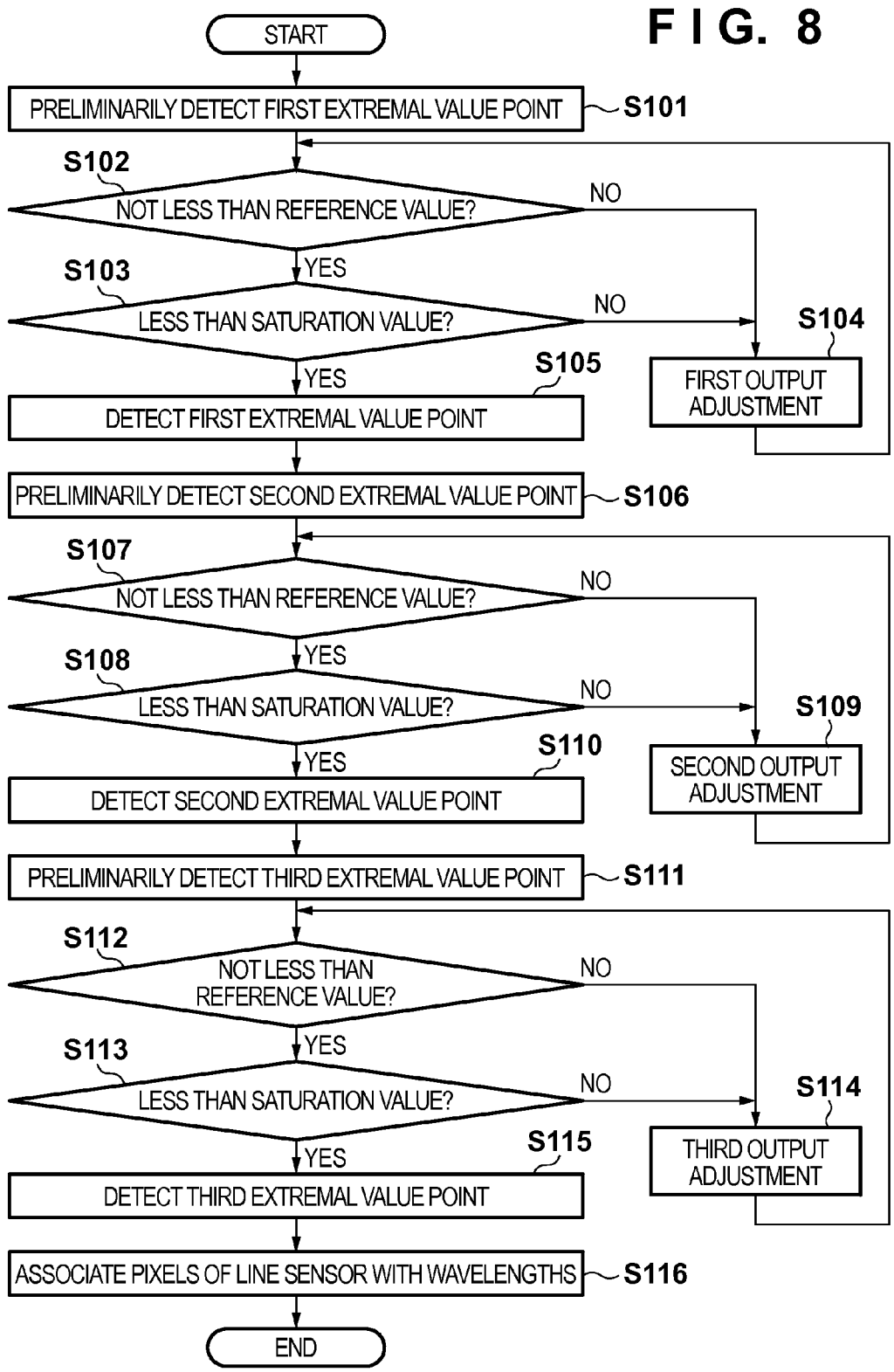
FIG. 8 is a flowchart according to the second embodiment.

The practical sequence of the method of value-setting wavelengths λ corresponding to the respective pixels of the line sensor 11 will be described below with reference to the flowchart shown in FIG. 8. This processing is executed by the spectrocolorimeter 10. Note that the memory 23 records in advance, as extremal value points of a spectrum obtained upon measuring the white reference sample shown in FIG. 2, wavelengths of 453 nm and 567 nm corresponding to two local maximum value points as shipping time information of the spectrocolorimeter 10. Furthermore, the memory 23 records a value of a wavelength of 491 nm corresponding to a local minimum value point located between the local maximum value points. In the example of this embodiment, a first extremal value point corresponds to the local maximum value point of the wavelength of 453 nm, and a second extremal value point corresponds to the local maximum value point of the wavelength of 567 nm. Also, a third feature point corresponds to the local minimum value point of the wavelength of 491 nm. In this embodiment, the shipping time information is used as a reference value in the subsequent processing. Furthermore, the reference value and saturation value used in the following processing are held in advance in the memory 23.

The spectrocolorimeter 10 preliminarily detects a first extremal value point (S101) as in the first embodiment. More specifically, the spectrocolorimeter 10 resets signals obtained by accumulating, for a predetermined time period, optical voltage outputs from the respective pixels of the line sensor 11. After that, the spectrocolorimeter 10 irradiates the white reference sample with light coming from the white LED 12 as a light source, and receives reflected light rays, which are spectrally separated for respective wavelengths, by the line sensor 11, thus obtaining spectrum signals. The spectrocolorimeter 10 AD-converts the spectrum signals using the AD converter 21, and sends digital signals to the control calculation unit 22.

The control calculation unit 22 extracts a maximum output value from the signals of the respective pixels in step S101, and determines whether or not that value is equal to or smaller than a saturation value and is equal to or larger than a predetermined reference value (steps S102 and S103). If the maximum output value reaches the saturation value (NO in step S103) or it is equal to or smaller than the reference value (NO in step S102), the control calculation unit 22 controls to adjust the accumulation time period of the line sensor 11 to obtain a proper output in step S104 (first output adjustment). In the adjustment method in this case, when the output value is less than the reference value, the control calculation unit 22 sets an accumulation time period of the respective pixels of the line sensor 11 to be longer. When the output value exceeds the saturation value, the control calculation unit 22 sets an accumulation time period of the respective pixels of the line sensor 11 to be shorter.

Figure 9:
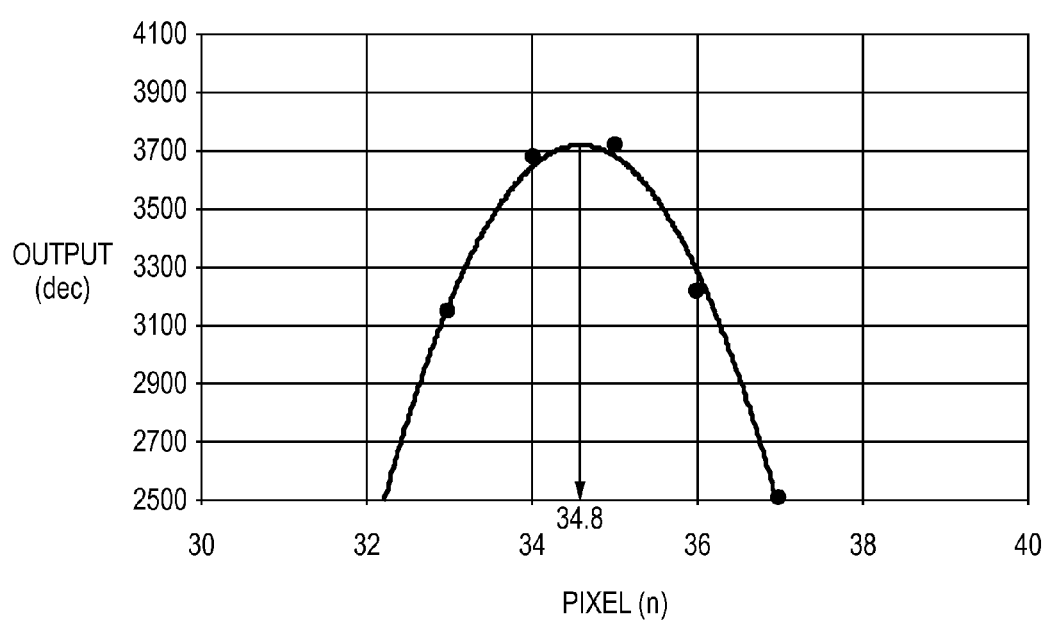
FIG. 9 is a graph showing a quadratic approximation curve according to the second embodiment.

After the accumulation time period of the line sensor 11 is properly adjusted (YES in steps S102 and S103), the AD converter 21 AD-converts optical voltage outputs, which are output from the respective pixels upon adjusting the output of the white LED 12 in step S105. Then the control calculation unit 22 stores the converted data in the memory 23 (detection of the first extremal value point). In the example of this embodiment, an output Vout(35) at an address "35" as a pixel position exhibits a local maximum value. In this case, the control calculation unit 22 reads out outputs (Vout(33) to Vout(37)) at an address "46" and two addresses each before and after that address, that is, a total of five addresses, and calculates a quadratic approximation curve (FIG. 9). Then, the control calculation unit 22 calculates a pixel value corresponding to a local maximum value of that approximation curve to include a decimal part, and combines the calculated pixel value with wavelength information stored in the memory 23 to set that value as a correspondence relationship between the calculated pixel value and wavelength.

Next, in step S106, the spectrocolorimeter 10 preliminarily detects a second extremal value point as in the first embodiment. In FIGS. 5A and 5B, the control calculation unit 22 confirms an output value of a pixel at an address "70" which exhibits the other local maximum value. Then, as in the first embodiment, in step S109, the control calculation unit 22 adjusts an accumulation time period of the line sensor, so that a pixel output value at an address "71" which exhibits a local maximum value becomes equal to or larger than the aforementioned reference value and less than the saturation value, while monitoring that pixel output (second output adjustment). The adjustment method in this step is the same as that executed in step S101.

After the accumulation time period is properly adjusted by the second output adjustment (YES in steps S107 and S108), the control calculation unit 22 confirms a local maximum value near the address "70" and reads out two addresses each before and after that address in step S110. In this embodiment, as shown in FIG. 5B, the output at the address "70" corresponds to a local maximum value, and outputs (Vout(68) to Vout(72)) at two addresses each before and after that address are read out. Then, as in step S105, the spectrocolorimeter 10 calculates a pixel value corresponding to the local maximum value from a quadratic approximation curve to include a decimal part, and combines the calculated pixel value with wavelength information stored in the memory 23 to set that value as a correspondence relationship between the calculated pixel value and wavelength.

Furthermore, in this embodiment, in step S111, the control calculation unit 22 confirms an output of a pixel at an address "45" which exhibits a local minimum value located between the aforementioned two local maximum value points, and those at two addresses each before and after that output (preliminary detection of a third extremal value point). With the same method as in steps S104 and S109, in step S114, the control calculation unit 22 adjusts an accumulation time period of the line sensor 11, so that a minimum value of the pixel outputs at the five addresses becomes equal to or larger than the same aforementioned reference value and less than the saturation value while monitoring these pixel outputs (third output adjustment). The adjustment method in this step is the same as that executed in step S101.

After the accumulation time period is properly adjusted by the third output adjustment (YES in steps S111 and S112), the control calculation unit 22 confirms a local minimum value near the address "45", and reads out outputs of two addresses each before and after that address in step S113. In this embodiment, as shown in FIG. 5A, as a result of this confirmation, the output at the address "45" corresponds to a local minimum value, and outputs (Vout(43) to Vout(47)) at two addresses each before and after that address are read out. As in step S105, the control calculation unit 22 calculates a pixel value corresponding to the local minimum value from a quadratic approximation curve to include a decimal part, and combines the calculated pixel value with wavelength information stored in the memory 23 to set that value as a correspondence relationship between the calculated pixel value and wavelength.

Figure 10A:
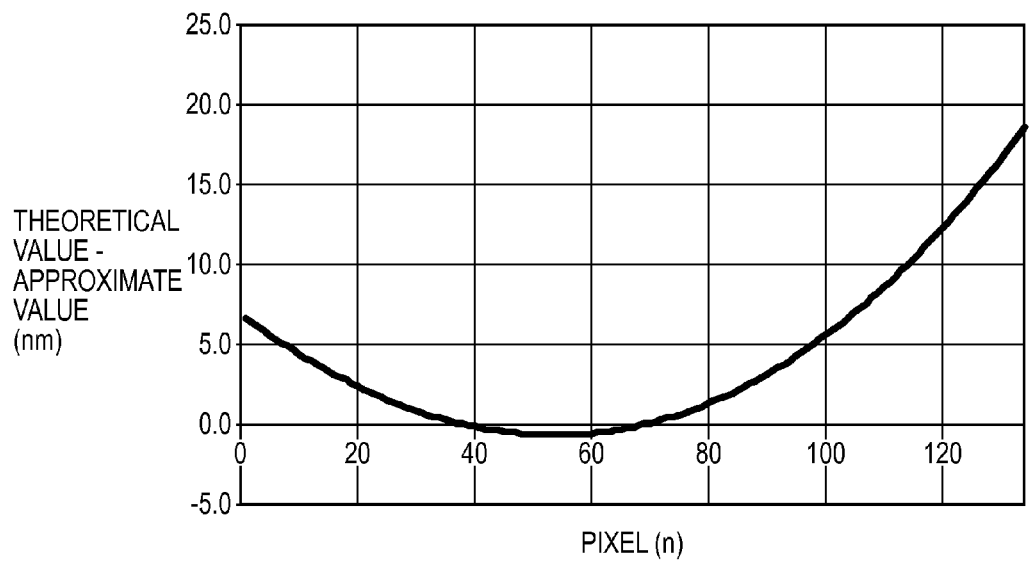
FIGS. 10A and 10B are graphs showing differences between theoretical values and approximate values.

In the first embodiment, under the assumption that wavelengths and relative positions on the line sensor 11 have a nearly linear relationship, linear interpolation is made from correspondence between two pairs of pixel positions and wavelengths, thus associating the respective pixels with the wavelengths. Note that a relative position on the line sensor 11 indicates how much distance a position is separated from a pixel position of an endmost wavelength (350 nm in FIG. 6), as can be seen from FIG. 6. Alternatively, a pixel corresponding to 750 nm may be used as a reference pixel. FIG. 10A shows differences between the correspondence relationship between pixels and wavelengths, which are theoretically calculated from optical geometric conditions and that between pixels and wavelengths, which are value-set by the linear interpolation in the first embodiment, contrary to the example of this embodiment. As can be seen from FIG. 10A, more strictly speaking, the relationship between the wavelengths and relative positions on the line sensor 11 is expressed by a curve. Hence, in this embodiment, based on the relationship between pixels and wavelengths at the three extremal value points calculated in steps S105, S110, and S113, the spectrocolorimeter 10 value-sets the relationship between the pixels and wavelengths using a quadratic curve in step S116.

Figure 10B:
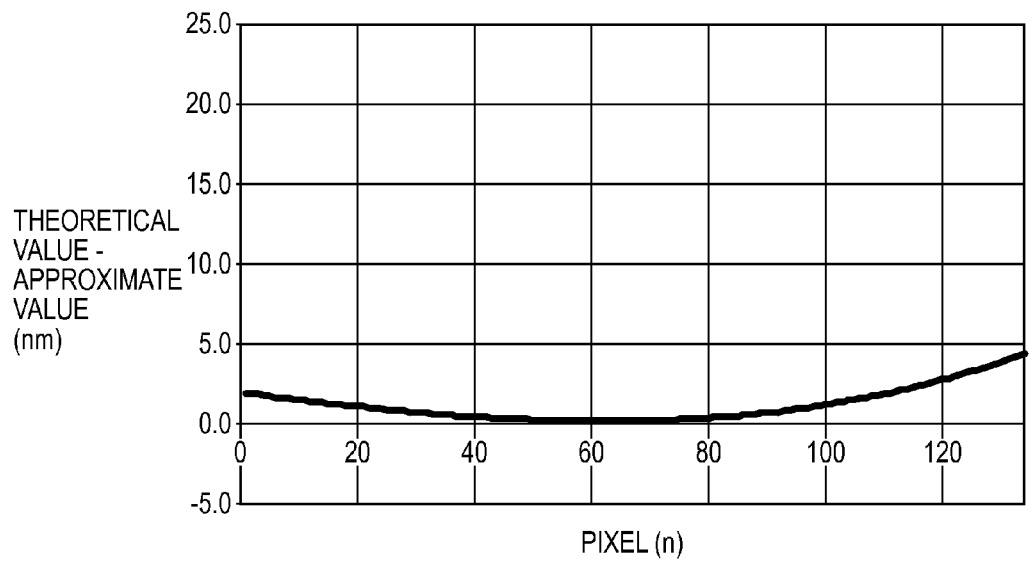

FIG. 10B shows differences between the correspondence relationship between pixels on the line sensor 11 and wavelengths, which are associated with each other by the method of this embodiment, and that between pixels and wavelengths, which are theoretically calculated. As can also be seen from FIG. 10B, the correspondence relationship between the pixels on the line sensor 11 and wavelengths is associated with each other more precisely. The spectrocolorimeter 10 controls the control calculation unit 22 to store this information in the memory 23, thus ending the re-value-setting operations.

With the aforementioned sequence, the value-setting operations of wavelengths λ corresponding to the respective pixels of the line sensor 11 are executed. According to this method, the wavelengths corresponding to the local maximum values and local minimum value as the three extremal value points upon reading the reflected spectrum from the white reference by the line sensor 11 are stored in the memory 23. Using these pieces of information, the value-setting operations of wavelengths λ corresponding to the respective pixels of the line sensor can be executed further precisely at an arbitrary timing.

In order to attain the value-setting operations using the quadratic curves, as described above, the three extremal value points have to be precisely extracted. According to the present invention, since corresponding pixels are specified after optimal signal amounts are respectively assured for the extremal value points, not only local maximum values from which high signal outputs are originally obtained but also a local minimum value which is not easily extracted due to the influence of noise in the conventional system can be precisely extracted as the extremal value points. Therefore, in this embodiment, the needs for light coming from an external calibration light source or addition of any calibration light source to the spectrocolorimeter can be naturally obviated. Furthermore, even when an LED whose spectrum includes a small number of peaks is used, the value-setting operations of the wavelengths λ corresponding to the respective pixels of the line sensor can be precisely executed.

With the aforementioned operations, association between the pixels of the line sensor 11 and the wavelengths λ is complete. Upon execution of colorimetry of an object to be measured using the spectrocolorimeter of this embodiment, the control calculation unit 22 replaces the wavelengths λ in equation (1) by pixel addresses n. Then, the control calculation unit 22 calculates Oi(n)/Wi(n) for respective pixels from output signals Oi(n) obtained upon measuring the white reference in advance, and output signals Wi(n) obtained upon measuring the object to be measured. After that, the control calculation unit 22 reads out the relationship between the respective pixels of the line sensor 11 and the wavelengths, which are associated with each other by this correction method, from the memory 23, and obtains Oi(λ)/Wi(λ) by replacing the pixel addresses n by the wavelengths λ. In this case, since each wavelength λ value-set on a corresponding pixel includes a decimal part, it does not often match λ of Wr(λ) stored in advance in the memory 23. In this case, interpolation processing is executed as needed to match the wavelengths λ, and spectral reflectances Or(λ) of the object to be measured can then be obtained according to equation (1).

Note that this embodiment uses the white LED prepared by packaging the LED element, which emits blue light, using the resin mixed with the yellow phosphor, and uses two local maximum value points and one local minimum value point as extremal value points. However, the present invention is not limited to such specific light source, and an LED whose spectrum has three or more local maximum value points or a light source other than the LED may be used.

In order to increase received signal amounts from the line sensor, the output intensity of the LED light source is adjusted in the first embodiment, and the accumulation time period of the line sensor is adjusted in the second embodiment. However, the present invention is not limited to such specific correction methods and extremal value point extraction methods, and these methods can be selectively used as needed. In this embodiment, one local minimum value is used as the third extremal value point in addition to the first embodiment. However, more local minimum values may be used as extremal value points.

Third Embodiment

[System Arrangement]

Figure 11:
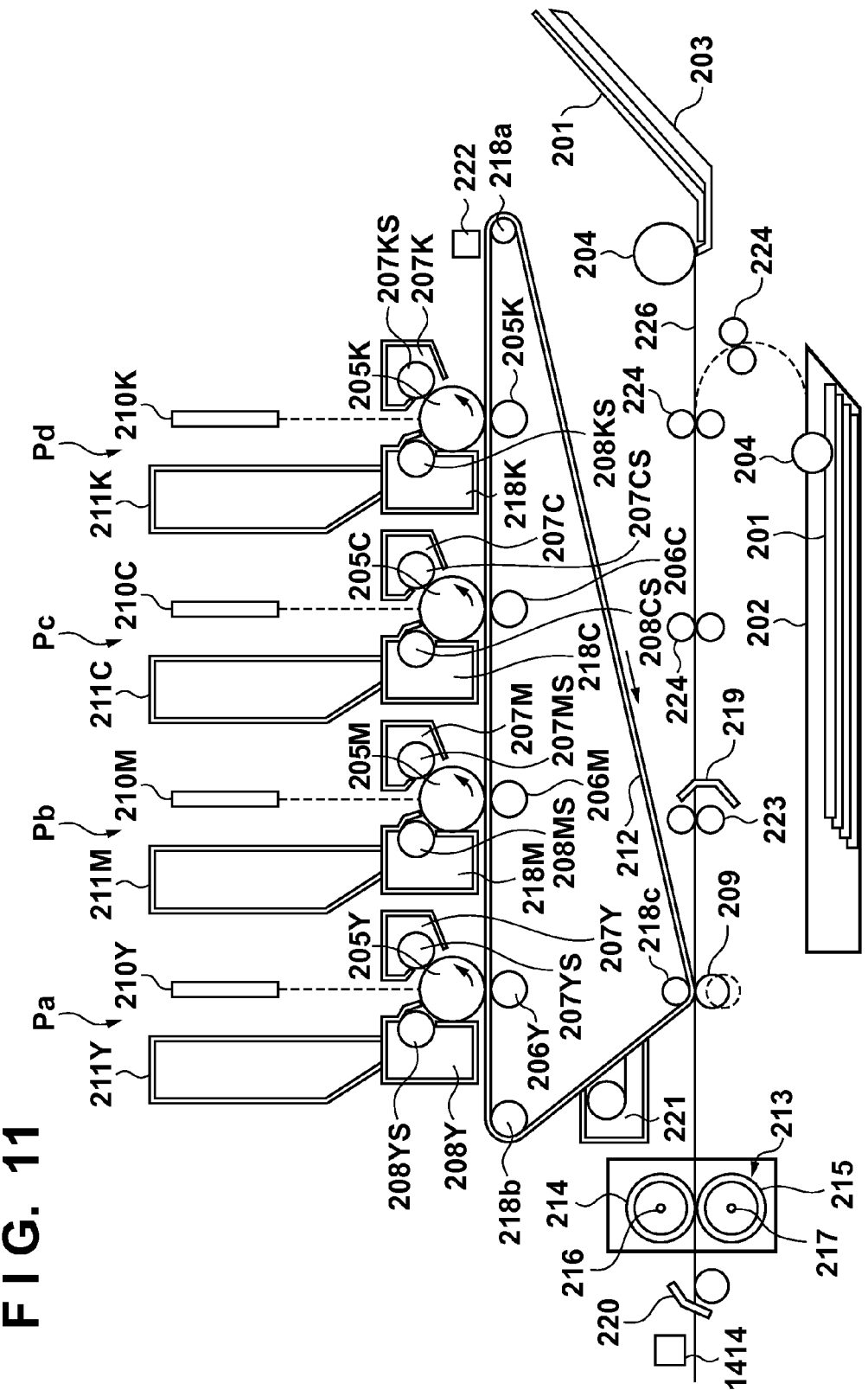
FIG. 11 is a schematic sectional view showing an embodiment of an image forming apparatus.

An embodiment of an image forming apparatus according to the present invention will be described below with reference to the drawings. FIG. 11 shows an arrangement example of the image forming apparatus according to this embodiment. In this embodiment, assume that a color laser printer as an electrophotographic multi-color image forming apparatus is adopted as the image forming apparatus. The arrangement of the overall laser printer and color control using a spectrocolorimeter will be described below. In this embodiment, the color laser printer forms electrostatic latent images by image light formed based on image signals in image forming units, and forms visible images by developing these electrostatic latent images. Furthermore, the color laser printer transfers these color visible images onto a transfer material as a printing medium, and then fixes the color visible images on the transfer material.

In this embodiment, the color laser printer includes four tandem stations Pa, Pb, Pc, and Pd corresponding to yellow (Y), magenta (M), cyan (C), and black (K) color materials. Image forming units of the stations Pa, Pb, Pc, and Pd respectively include photosensitive drums 205Y, 205M, 205C, and 205K, injection chargers 207Y, 207M, 207C, and 207K as primary chargers, developers 208Y, 208M, 208C, and 208K, and toner cartridges 211Y, 211M, 211C, and 211K. Below the respective photosensitive drums, an intermediate transfer member 212 is arranged, and primary transfer units 206Y, 206M, 206C, and 206K are arranged in correspondence with the photosensitive drums. A transfer material 201 is fed from a paper cassette 202 to a secondary transfer roller 209, and is then conveyed to a fixing unit 213.

Each photosensitive drum is formed by coating an organic photoconductive layer on the outer circumference of an aluminum cylinder, and is rotated by a driving force transmitted from a driving motor (not shown). Each photosensitive drum is rotated counterclockwise according to an image forming operation.

The respective stations include, as primary chargers, the four injection chargers 207Y, 207M, 207C, and 207K required to charge the Y, M, C, and K photosensitive drums. The respective injection chargers include sleeves 207YS, 207MS, 207CS, and 207KS. Exposure light beams to the respective photosensitive drums come from scanner units 210Y, 210M, 210C, and 210K, and selectively expose the surfaces of the photosensitive drums charged by the primary chargers, thereby forming electrostatic latent images.

In order to visualize the formed electrostatic latent images, the respective stations include, as developing units, the four developers 208Y, 208M, 208C, and 208K used to perform Y, M, C, and K developing operations. The respective developers include sleeves 208YS, 208MS, 208CS, and 208KS. Note that each developer is detachably attached to the image forming apparatus main body. The intermediate transfer member 212 is an endless belt member which is extended across a driving roller 218a and driven rollers 218b and 218c. The intermediate transfer member 212 contacts the respective photosensitive drums, is rotated clockwise at the time of color image formation, and sequentially receives images transferred by operations of primary transfer rollers (primary transfer units) for respective colors.

The paper cassette 202 or a feed tray 203 as a paper feed unit (paper feed port) houses transfer materials 201, and each transfer material 201 is conveyed along a convey path 225, which includes a feed roller 204, convey rollers 224, and the like, and arrives at registration rollers 223. This arrival is detected by a pre-registration sensor 219. At an image formation timing, the pre-registration sensor 219 controls to adjust an arrival timing of color visible images on the intermediate transfer member 212 to a transfer region, thereby stopping conveyance of the transfer material for a predetermined time period. The transfer material 201 is fed from the registration rollers 223 to the transfer region, and the secondary transfer roller 209 is brought into contact with the intermediate transfer member 212 to clamp and convey the transfer material 201 thereby simultaneously superimposing and transferring the color visible images on the intermediate transfer member 212 onto the transfer material 201.

The fixing unit 213 fixes the transferred color visible images while conveying the transfer material 201, and includes a fixing roller 214 for heating the transfer material 201 and a pressure roller 215 for bringing the transfer material 201 into pressure contact with the fixing roller 214, as shown in FIG. 11. The fixing roller 214 and pressure roller 215 are formed to have a hollow shape, and respectively incorporate heaters 216 and 217. That is, the transfer material 201 which holds the color visible images is conveyed by the fixing roller 214 and pressure roller 215, and is applied with heat and pressure, thereby fixing the toner images on its surface. After the visible images are fixed by the fixing roller 214, the transfer material 201 is discharged onto a discharge unit (not shown) by discharge rollers (not shown), thus ending an image forming operation. The transfer material 201 discharged from the fixing unit 213 is detected by a fixing/discharge sensor 220.

A cleaning unit 221 removes residual toners, which remain without being transferred onto the transfer material 201 of four color visible images formed on the intermediate transfer member 212, from the intermediate transfer member 212, and stores the removed toners. A density detection unit 222, which is arranged above the intermediate transfer member 212 on the downstream side of the station Pd shown in FIG. 11, detects a density of a density detection pattern formed on the transfer material 201. Also, a spectrocolorimeter 1414 used to read toner patches formed on the transfer material 201 is arranged at an intermediate position between the fixing unit 213 and discharge port (not shown).

Note that the arrangement of the image forming apparatus described using FIG. 11 is applicable to the spectrocolorimeter 10 described in the first and second embodiments. In this case, the spectrocolorimeter 10 is equipped in the image forming apparatus in place of the spectrocolorimeter 1414.

[Image Processing Unit]

Figure 12:
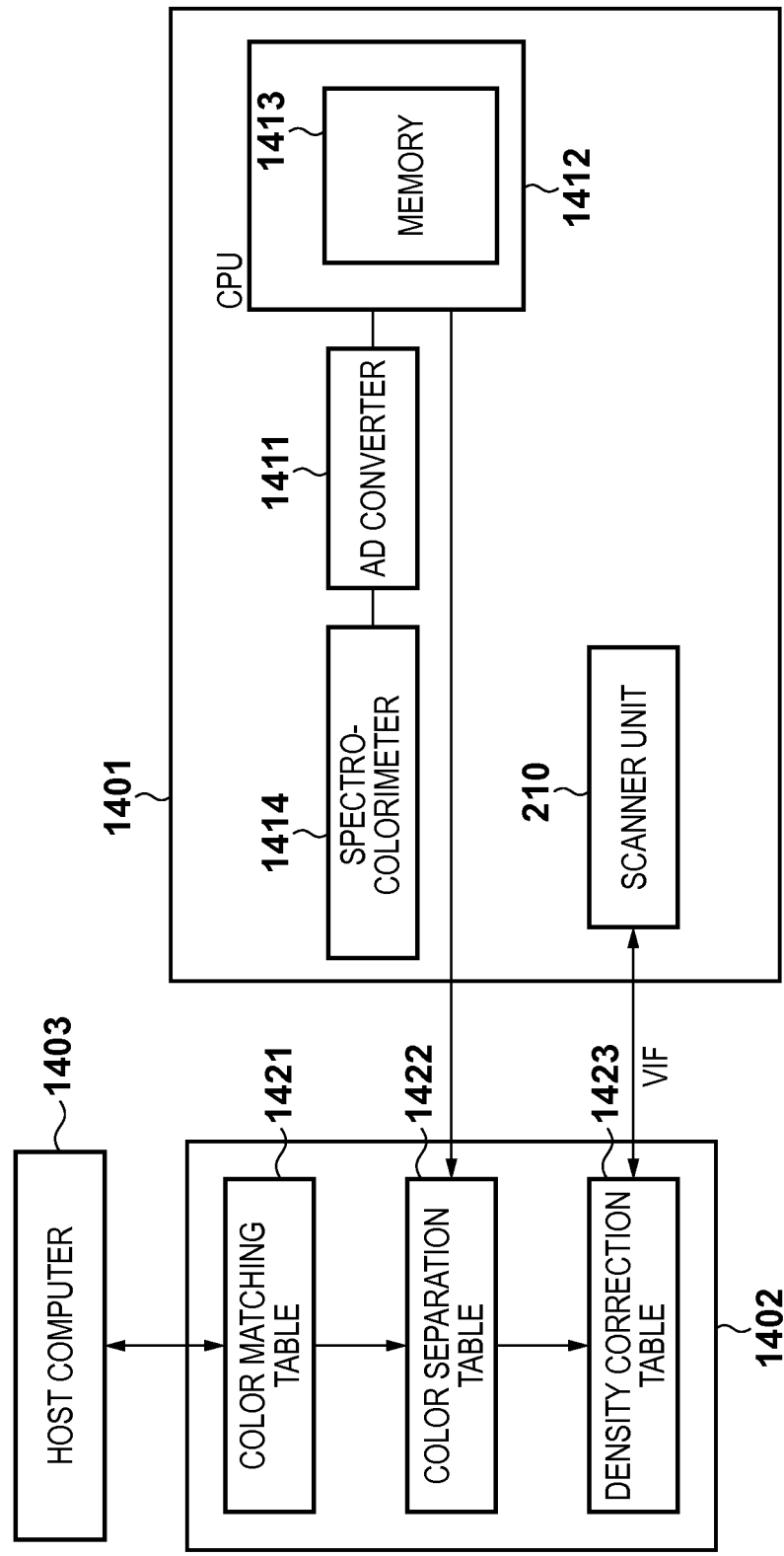
FIG. 12 is a schematic block diagram for explaining the arrangement of the image forming apparatus.
Figure 13:
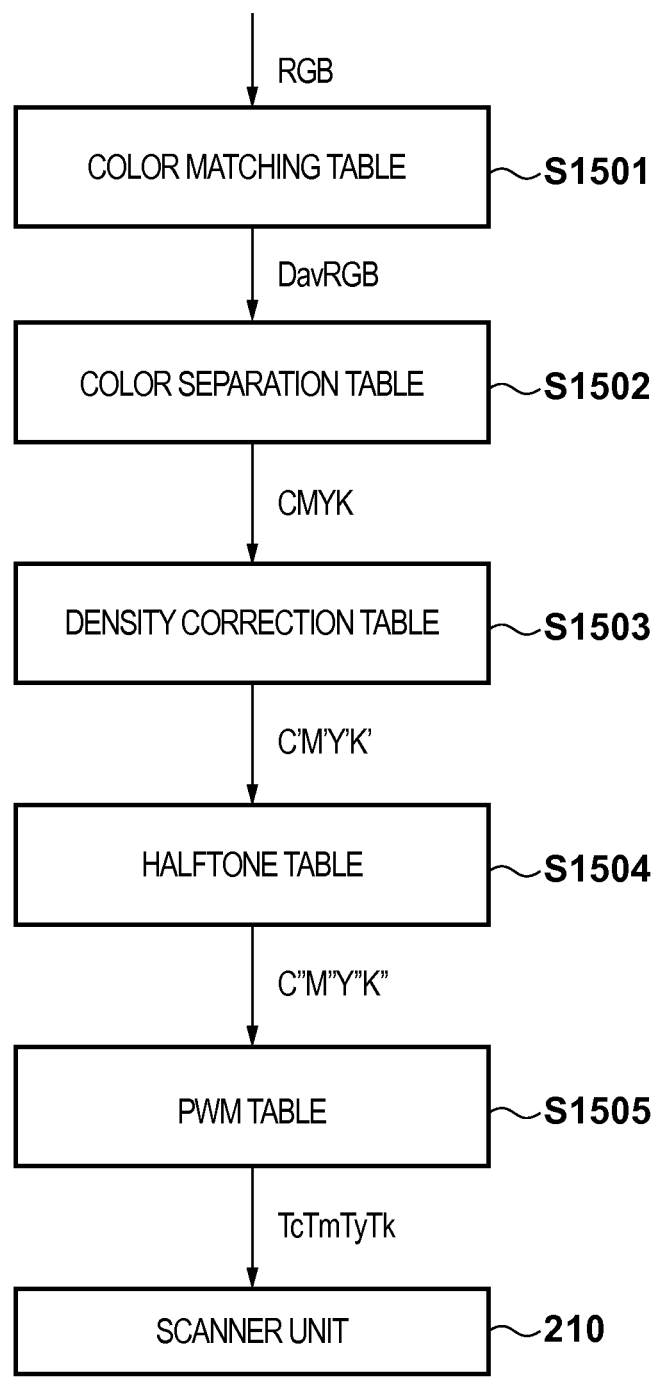
FIG. 13 is a chart showing the sequence of data conversion in an image processing unit.

Processing and color correction in an image processing unit will be described below with reference to FIG. 12 as the block diagram of the image forming apparatus and FIG. 13 which shows an example of processing in the image processing unit. An image processing unit 1402 and image forming unit 1401 of the image forming apparatus are connected via a video interface, and the image processing unit 1402 is connected to a host computer 1403 as an external terminal and a network (not shown). A storage unit of the image processing unit 1402 stores a color matching table 1421, color separation table 1422, and density correction table 1423 used in color conversion. The image forming unit 1401 includes an AD converter 1411 which converts signals from the spectrocolorimeter 1414, a CPU 1412 which executes image formation processing and processes measurement results from the spectrocolorimeter 1414, and a memory 1413 which temporarily stores the measurement results. Note that in this embodiment, the image forming unit 1401 uses the same spectrocolorimeter as the spectrocolorimeter 10 described in the first embodiment.

Note that the first and second embodiments have explained the spectrocolorimeter 10 which includes the AD converter and memory. However, in the third embodiment, the AD converter and memory are externally connected to the spectrocolorimeter 1414. However, in the third embodiment, the spectrocolorimeter described in the first and second embodiments may be adopted, needless to say.

The sequence of data conversion in the image processing unit 1402 will be described below with reference to FIG. 13. In step S1501, the image processing unit 1402 converts RGB signals into device RGB signals (to be referred to as DevRGB signals hereinafter), which match a color gamut of the color image forming apparatus, using the color matching table 1421, which is prepared in advance. In this case, the RGB signals are sent from, for example, the host computer 1403. In step S1502, the image processing unit 1402 converts the DevRGB signals into CMYK signals as toner color material colors of the color image forming apparatus using the color separation table 1422. In step S1503, the image processing unit 1402 converts the CMYK signals into C'M'Y'K' signals applied with correction of tone-density characteristics using the density correction table 1423 required to correct tone-density characteristics unique to each color image forming apparatus. In step S1504, the image processing unit 1402 executes halftone processing to convert the C"M'Y'K' signals into C"M"Y"K" signals. In step S1505, the image processing unit 1402 converts the C"M"Y"K" signals into exposure times Tc, Tm, Ty, and Tk in the corresponding scanner units 210Y, 210M, 210C, and 210K using a PWM (Pulse Width Modulation) table.

In default settings, the image processing unit 1402 stores a plurality of CMYK color patch data. Default CMYK color patch data is printed according to the processing sequence shown in FIG. 13. A color patch image formed on the transfer material 201 undergoes colorimetry by the spectrocolorimeter 1414, thus reading its color value (for example, a value on a CIEL*a*b*color space).

The image processing unit 1402 sends the read color value to its color converter to convert it into CMYK data depending on the image forming apparatus using a CMS (Color Management System; not shown). Then, the image processing unit 1402 compares the converted CMYK data and those of the default color patch data to generate correction data ΔC, ΔM, ΔY, and ΔK used to correct their differences. The image processing unit 1402 applies this processing to a plurality of patches, and generates correction data ΔC, ΔM, ΔY, and ΔK by interpolation for CMYK data which are not stored as patches. The image processing unit 1402 saves these correction data as the color separation table 1422 (color converter or color correction unit). Then, using the color separation table 1422 (color converter or color correction unit) which saves the color correction data, color processing at an actual image forming timing is executed. The same applies to the first and second embodiments.

[Wavelength-Light Intensity Spectrum Characteristic]

Figure 14A:
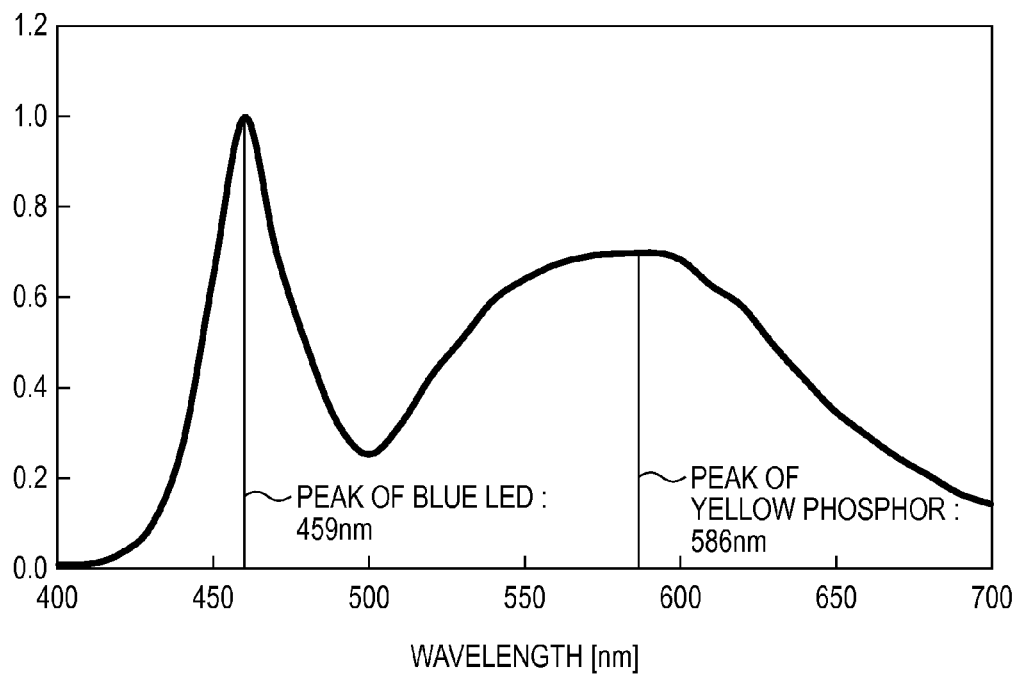
FIGS. 14A and 14B are graphs showing spectral luminance characteristics of a white LED and toner.

The relationship between the wavelength-light intensity spectrum characteristic of a light source and spectral reflectances of patches will be described below. Note that the image forming unit 1401 has the arrangement of the spectrocolorimeter equivalent to that of the spectrocolorimeter 10 described in the first embodiment, except that the AD converter 1411, CPU 1412 (corresponding to control calculation unit 22), and memory 1413 are externally connected. Therefore, a detailed description of the spectrocolorimeter will not be repeated. In this embodiment, a line sensor has 136 effective pixels (addresses "3" to "138") by adding two extra pixels to the 134 pixels described in the first embodiment. Furthermore, the line sensor has a total of four dark pixels (addresses "1", "2", "139", and "140"), which are arranged for dark output correction at end portions so as to improve symmetry of the effective pixels and to reduce inter-element variations. In this embodiment, a white LED used as a light source of the spectrocolorimeter 1414 exhibits roughly the same characteristic as that shown in FIG. 2 described in the first embodiment. More specifically, FIG. 14A shows the spectral characteristic of the white LED. Note that in FIG. 14A, the abscissa plots wavelengths, and the ordinate plots relative light intensities (luminance levels). The characteristic shown in FIG. 14A is normalized to have "1" as a maximum value of a light intensity. A peak (459 nm) around a wavelength of 460 nm is an emission spectrum of the blue LED, and that (586 nm) around 590 nm is a spectrum of the yellow phosphor.

As will be described in detail later, this embodiment uses a peak of spectral reflected light from a patch to specify a wavelength. Note that a wavelength can be precisely specified for a steep peak like that of the blue LED, but it is difficult to precisely specify a wavelength for a smooth peak exhibited by the yellow phosphor. On the other hand, toners used in the color image forming apparatus exhibit spectral characteristics of reflected light shown in FIG. 14B. Note that in FIG. 14B, the abscissa plots wavelengths, and the ordinate plots spectral reflectances. A general spectral characteristic of a toner does not include any steep peak, but includes a wavelength range having a steep slope (a large value variation). The wavelength range of the steep slope in the example shown in FIG. 14B, for example, corresponds to a range from about 470 nm to 500 nm for Y, and that from about 590 nm to 610 nm for M.

Figure 14B:
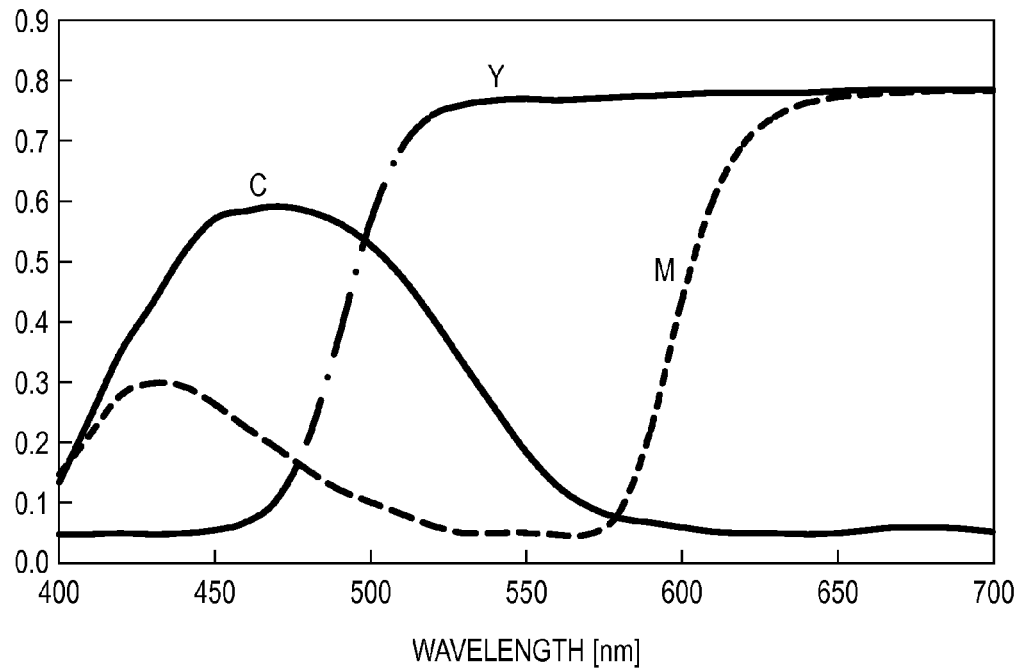

FIG. 15 shows the spectral characteristic of the reflected light (spectral intensities of reflected light) obtained when an M patch is projected by the white LED. This spectral characteristic of the reflected light can be calculated by multiplying spectral characteristics of the white LED and M patch for respective wavelengths. At this time, from the relationship between the spectral characteristics of the white LED and M patch, a steep peak appears in the vicinity of 620 nm in the spectral characteristic of the reflected light. This peak is generated when a smooth slope of the spectral characteristic in light emitted by the white LED, which characteristic falls with increasing wavelength, as shown in FIG. 14A, is superposed on a steep slope of the spectral characteristic of the M patch, which characteristic rises with increasing wavelength, as shown in FIG. 14B.

More specifically, a wavelength range from about 550 nm to 600 nm in which the spectral characteristic (spectral luminance) of the white LED is nearly constant exhibits a spectral characteristic of a rising slope, as indicated by that (spectral reflectance) of the M patch in the spectral characteristic of the reflected light. As for a wavelength range from about 600 nm to 620 nm, the white LED exhibits a spectral characteristic (spectral luminance) of a falling slope. However, since the M patch has the spectral characteristic (spectral reflectance) of a steep rising slope more than that of the white LED, the spectral characteristic of the reflected light having a more dominant rising slope is exhibited. In a wavelength range after 620 nm, since the M patch exhibits a smoothly rising or nearly constant spectral reflectance characteristic, but the spectral characteristic (spectral luminance) of the white LED has a falling slope, the spectral characteristic (spectral luminance) of the white LED becomes dominant. Hence, the spectral characteristic of the reflected light has a falling slope. In this case, around 620 nm where the rising slope is switched to the falling slope, that is, at a balance position (wavelength) between the falling slope of the white LED and the rising slope of the M patch, a peak (extremal value point) appears in the spectral characteristic (spectral intensity of the reflected light) of the reflected light.

Then, based on the relationship between the spectral characteristic of the patch and that (spectral luminance) of the light source, a steep peak (621 nm) of the spectral characteristic can be realized, as indicated by (a) of FIG. 15. Using this steep peak, a wavelength can be specified precisely. Note that the generation mechanism of the steep peak of the spectral characteristic, as indicated by (a) of FIG. 15, can be summarized as follows. In the spectral characteristic (spectral reflectance) of the toner patch and that (spectral luminance) of the light source, a slope (change) of one spectral characteristic is dominant up to a range of a certain wavelength in a continuous wavelength range of interest, but that of the spectral characteristic of the other wavelength is dominant in a range from the certain wavelength. At this time, the dominant slopes of the spectral characteristics have inclinations opposite to each other. Then, at a wavelength at the dominant slopes of the spectral characteristics are switched, in other words, a balance is generated by the mutual slope characteristics, an extremal value point appears. With this mechanism, an extremal value point appears at 621 nm in case of FIG. 15.

A patch used in this embodiment desirably has a high-saturation pattern, and for example, a single-color solid pattern is used. The "solid pattern" is a toner image as a high-density pattern having a coverage rate (printing percentage) =100% (or nearly 100%). In some image forming apparatuses, a coverage rate of a single color is not 100%. In such case, the solid pattern indicates that of a patch having a maximum coverage rate. When the density of a patch pattern is too low, a contrast between reflection and absorption of light by a toner image is reduced, and a generation range of a steep slope in the spectral characteristic is narrowed down, thus forming a smooth slope. For this reason, a low-density patch pattern is not preferable.

Also, image saturation lowers by mixing a plurality of toners, and a contrast between reflection and absorption of light by a toner image is reduced. Furthermore, when toners are mixed, instability of a mixing ratio leads to that of a spectral reflection characteristic. Hence, a color-mixed pattern is not preferable, either.

For the aforementioned reasons, a toner image is desirably a single-color solid pattern. However, as long as a contrast between reflection and absorption of light by a toner image, which is enough to specify a wavelength, can be assured, and the spectral reflection characteristic is stable, the coverage rate need not be 100% or a color-mixed pattern may be used.

This embodiment will explain a case in which a solid pattern, which is formed by a single-color toner and allows most stable wavelength specification is used, that is, an example in which the effect of the present invention can be maximally expected. More specifically, a wavelength correction algorithm required to specify a correspondence relationship between pixel positions and wavelengths using the white LED using the blue LED and yellow phosphor as the light source and an M toner as a toner patch will be described below.

[Wavelength Correction Processing]

Figure 16:
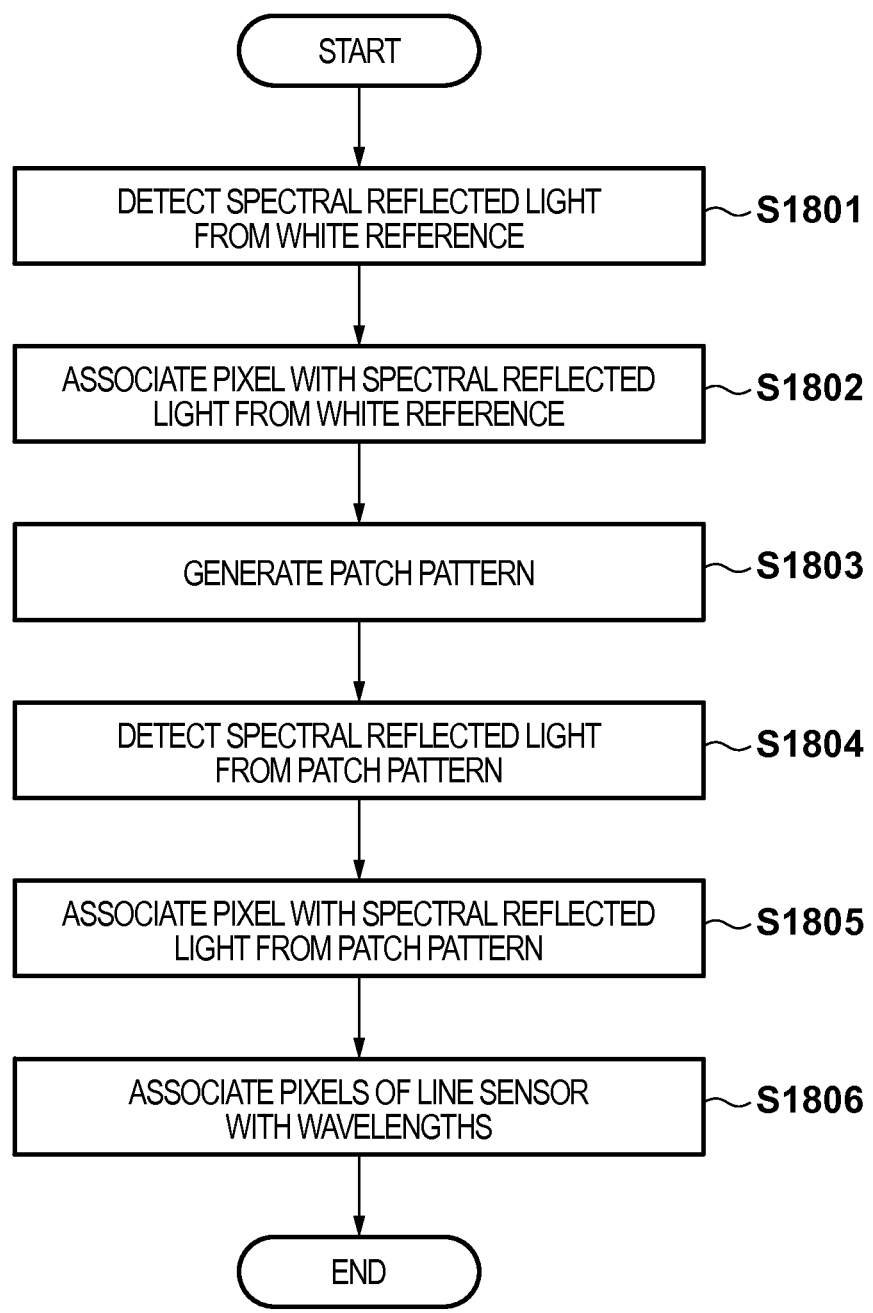
FIG. 16 is a flowchart for explaining output correction of the line sensor.
Figure 17:
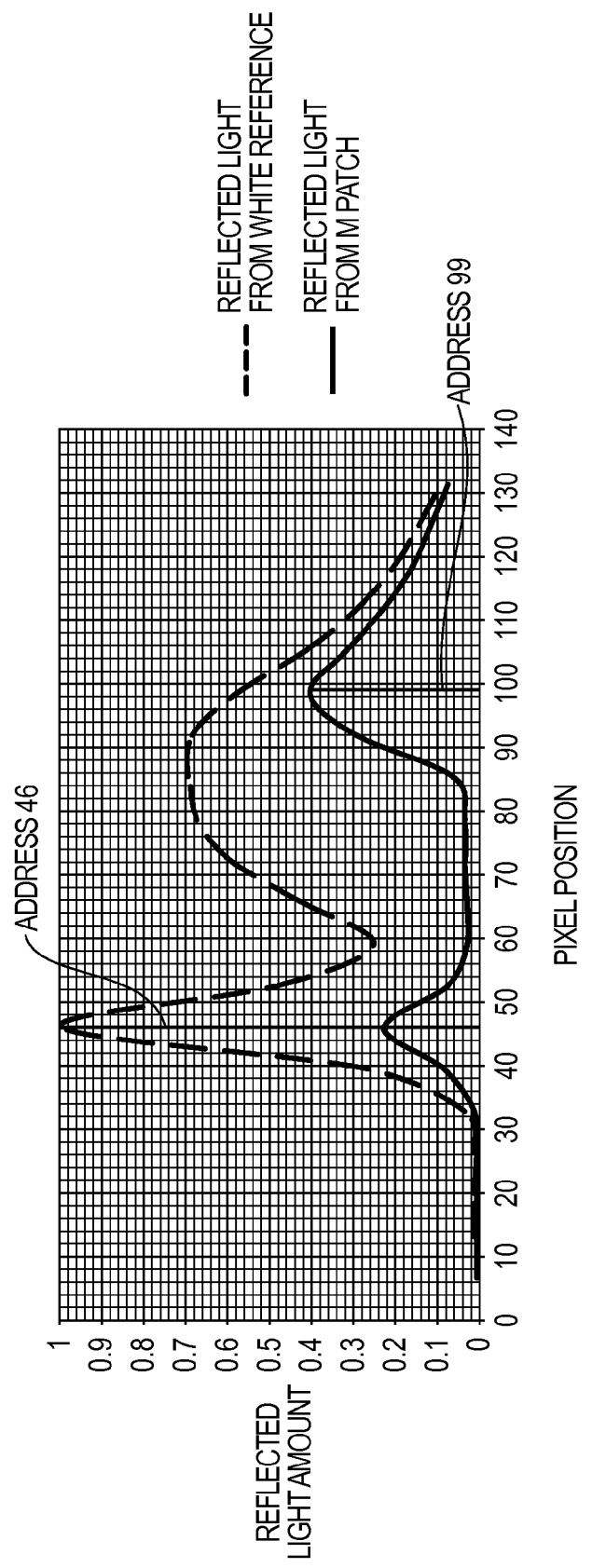
FIG. 17 is a graph showing the correspondence relationship between pixel positions and reflected light amounts of a white reference and M patch.

The practical wavelength correction sequence will be described below with reference to FIG. 16 as the flowchart and FIG. 17. FIG. 17 shows colorimetric values (reflected light amounts) which are read from the white reference and M patch by the line sensor 11, and are normalized based on a maximum value of the white reference. The ordinate of FIG. 17 plots relative reflected light amounts (reflection intensities). Assume that the memory 1413 as a storage unit holds, as a dispersing light profile, the steep peak wavelength of 459 nm (FIG. 14A) of the white LED and the steep peak wavelength of 621 nm (FIG. 15) of the reflected light upon irradiating the M patch with light from the white LED.

As described above, this embodiment uses the detection method (extremal value point detection) in the first embodiment in peak wavelength detection. That is, as shown in FIG. 3 of the first embodiment, at the time of detection of a peak wavelength (extremal value point) for the white reference (step S1801) and that of a peak wavelength for the M patch (step S1804), the emission output of the white LED 12 is adjusted, so that an extracted output value satisfies [reference value≤maximum output value<saturation value]. More specifically, the CPU 1412 controls the emission output of the white LED 12 while monitoring AD conversion signals which are received as needed, and adjusts a colorimetry condition to attain a proper output which satisfies the aforementioned condition. At this time, when the output value is less than the reference value at the time of detection of the white reference and M patch, the CPU 1412 controls to raise the output of the white LED 12. On the other hand, when the output value exceeds the saturation value, the CPU 1412 controls to fall the output of the white LED 12. Then, the CPU 1412 specifies correspondence between each of output values of the white reference and M patch and a pixel, and extracts a maximum output value from signals of respective pixels (steps S1802 and S1805).

In step S1801, the CPU 1412 resets signals obtained by accumulating, for a predetermined time period, optical voltage outputs from the respective pixels of the charge accumulation type line sensor 11 shown in FIG. 1B. After that, the CPU 1412 irradiates the white reference 24 in FIG. 1A with light coming from the white LED 12 as a light source, and diverges reflected light from the white reference 24 for respective wavelengths using the diffraction grating 18. Then, the spectrocolorimeter 1414 inputs dispersing light rays of the respective wavelengths to the line sensor 11, which acquires signals by accumulating optical voltage outputs generated in response to the input light for a predetermined time period. The AD converter 1411 AD-converts the acquired signals, and stores digital signals in the memory 1413 (memory 23) as a storage unit included in the CPU 1412 used to control the operation of the image forming apparatus.

In step S1802, the CPU 1412 reads out the outputs of the line sensor 11, which are stored in the memory 1413. The CPU 1412 subtracts the output from the dark pixel (for example, address "1") from the readout sensor outputs, thus obtaining signals (the broken curve in FIG. 17) according to light amounts purely applied to the line sensor 11 by excluding dark current components generated during the accumulation time period. Note that as for processing related to the dark pixel, the same processing as in the third embodiment may be executed in the first and second embodiments.

The signals of the broken curve in FIG. 17 have a shape obtained by multiplying the waveform shape of the white LED 12, the spectral reflection characteristic of the white reference 24, and the spectral sensitivity characteristic of the spectrocolorimeter 1414, and the abscissa plots pixel positions. Note that in the description of this embodiment, assume that the spectral reflection characteristic of the white reference 24 and the spectral sensitivity characteristic of the spectrocolorimeter 1414 are flat in a wavelength range of visible light.

In FIG. 17, an output Vout(46) at an address "46" as a pixel position exhibits a peak value. On the other hand, as described above, the memory 1413 pre-stores peak wavelength information of the light source. By comparing the wavelength information and signals, a pixel at the address "46" can be specified as that which receives light of a wavelength of 459 nm.

In step S1803, the image forming unit 1401 generates a patch pattern. In this case, the reality of the image forming unit 1401 which generates the patch pattern corresponds to members associated with toner image formation described in FIG. 11. As a result of this patch pattern generation in step S1803, an M solid patch for sensor calibration is formed on the transfer material 201, and the spectrocolorimeter 1414 measures the M solid patch.

In step S1804, the spectrocolorimeter 1414 detects spectral reflected light from the patch pattern. The CPU 1412 resets signals obtained by accumulating, for a predetermined time period, optical voltage outputs from the respective pixels of the charge accumulation type line sensor 11. After that, at a timing at which the solid patch as the object 14 to be measured is irradiated with light coming from the white LED 12 as a light source, reflected light, which is reflected from the M solid patch, and is diverged for respective wavelengths by the diffraction grating 18, enters the line sensor 11. Then, the line sensor 11 acquires signals by accumulating optical voltage outputs generated in response to the incident light for a predetermined time period. In this case as well, in the peak wavelength detection, the detection method (extremal value point detection) in the first embodiment is used. The AD converter 1411 connected to the spectrocolorimeter 1414 AD-converts these signals, and stores digital signals in the memory 1413 as a storage unit included in the CPU 1412 used to control the operation of the image forming apparatus.

In step S1805, the CPU 1412 decides a correspondence relationship between spectral reflected light from the measured patch pattern and pixels. The CPU 1412 reads out the outputs (the solid curve in FIG. 17) of the line sensor 11 of the patch pattern stored in the memory 1413. Signals (the solid curve in FIG. 17) according to the light amounts purely applied to the sensor can be obtained by subtracting the output from the dark pixel (for example, address 139) from the readout sensor outputs so as to remove dark current components generated during the accumulation time period. As shown in FIG. 17, an output Vout(99) of a pixel at an address "99" exhibits a peak value. On the other hand, as described above, the memory 1413 pre-stores peak wavelength information of the M solid patch shown in FIG. 15. By comparing the peak wavelength information pre-stored in the memory 1413 with the value shown in FIG. 17, the pixel at the address "99" can be specified as that which receives a light of wavelengths including 621 nm.

Figure 20:
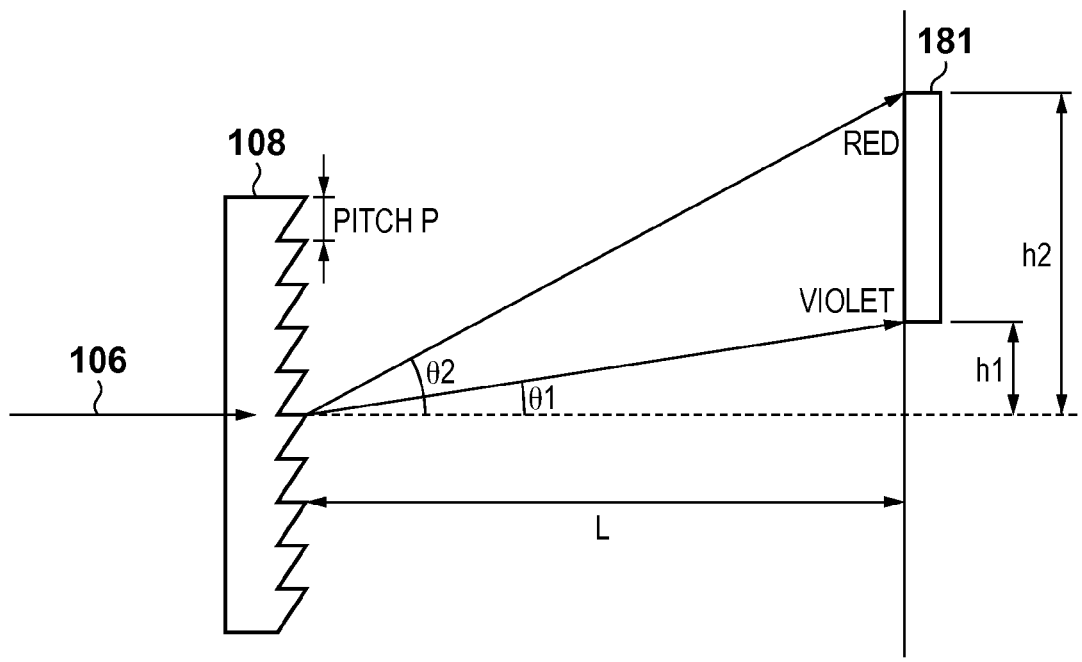
FIG. 20 is a view for explaining an optical system of the spectrocolorimeter.

In step S1806, the CPU 1412 decides correspondence between the pixels of the line sensor 11 and wavelengths. As described above, the CPU 1412 specifies correspondence between two pairs of pixels and wavelengths from the pixel at the address "46", which receives light of wavelengths including 459 nm and the pixel at the address "99" which receives light of wavelengths including 621 nm by reading spectral light from the white reference 24 and M solid patch using the spectrocolorimeter 1414. For example, in the arrangement of a spectrocolorimeter shown in FIG. 20, wavelengths and relative positions of pixels on the line sensor 11 have a nearly linear relationship (FIG. 18). This is the same as the relationship described using FIG. 6 in the first embodiment. Therefore, by making linear interpolation based on correspondence between the two pairs of pixel positions and wavelengths, the respective pixels can be associated with wavelengths. This is the same as the association described using FIG. 7 in the first embodiment. FIG. 19 shows the wavelengths of the respective pixels of the line sensor 11, which are associated by this correction. The spectrocolorimeter 1414 detects spectral light of a wavelength associated with each pixel. The CPU 1412 connected to the spectrocolorimeter 1414 stores detected information in the memory 1413, thus ending the correction operation.

By executing the aforementioned wavelength correction algorithm, even when the frame body of the spectrocolorimeter 1414 is deformed due to aging, heat, or stress, and the position of spectral light projected onto the line sensor is shifted, the correspondence relationship between the respective pixels and wavelengths can be corrected at the time of correction. The spectral characteristic of the light source has variations to some extent. The peak of the wavelength of 459 nm of the white LED shown in FIG. 14A may often suffer variations of about 10 nm due to, for example, variations of a blue LED chip. However, the image forming apparatus main body stores and holds the peak wavelength unique to the white LED of the incorporated spectrocolorimeter 1413 in the memory 1413 in advance, and uses the peak value (extremal value point) detection method described in the first embodiment together, thus attaining more precise correction.

In the above description, reflected light from the white reference 24 is used. Also, the same effect is expected for dispersing light with respect to reflected light from a transfer material if that transfer material is white. However, it is not desirable to use a transfer material such as colored paper whose spectral reflection characteristic is deviated from that close to white.

Note that in this embodiment, the spectrocolorimeter spectrally separates reflected light using the diffraction grating 18 according to the structure shown in FIG. 1A. However, the present invention is not limited to the diffraction grating, and a prism may be used. In addition, the image forming apparatus which forms a toner image (patch pattern) on an image carrier has been exemplified. However, the present invention is similarly effective for an image forming apparatus such as an ink-jet printer which forms an image using inks. In this case, in addition to reflected light from the white reference, dispersing light with respect to reflected light from a printing medium may be used.

As described above, in the spectrophotometric spectrocolorimeter, even when a positional deviation has occurred between the line sensor and optical system, correspondence between the pixels of the line sensor and wavelengths of incident light can be specified. Hence, the need for high-precision components and strict management/adjustment of positional precision can be obviated, and spectral reflectances of a toner patch can be detected with low cost. Without adding a filter or single-color light source in the related art, reflected light corresponding to a wavelength of a single color enters each pixel of a light detection unit, and correspondence between the wavelength and pixel can be precisely decided without requiring high positional precision.

When correction is made using a toner image on a paper sheet and the white reference 24 in FIG. 1A, a colorimetry position may change due to the thickness or wavy surface of a paper sheet, and a projected position of dispersing light may change. When the toner image on the paper sheet and white reference 24 undergo colorimetry, it is desirable to correct the projected position with respect to the colorimetry position or to adopt a mechanism for bringing the white reference 24 closer to the spectrocolorimeter 1414 by an amount corresponding to the thickness and wavy surface of the paper sheet.

In this embodiment, colors of respective color toner patches can be precisely detected, and are feedback-controlled to an LUT (color separation table 1422), thus providing an inexpensive image forming apparatus with high color reproducibility.

Fourth Embodiment

This embodiment will explain an arrangement in which a steep peak due to a spectral characteristic of a toner and that of a light source of a spectrocolorimeter is recorded in a recording unit included in an expendable of an image forming apparatus. The image forming apparatus copes with a change in spectral characteristic caused by a toner of a different lot or due to a change of a color material based on this information.

For example, a process integrated cartridge (to be referred to as a CRG hereinafter) is available as an expendable, and a wavelength peak value (corresponding to 586 nm in FIG. 14A) unique to a filled toner is stored in a CRG memory before shipment of the expendable. When a new CRG is mounted on the image forming apparatus or at a timing caused by the image forming apparatus, the wavelength peak value stored in the CRG memory (not shown) is automatically transferred to and stored in the memory 1413 shown in FIG. 12. Then, the wavelength correction processing described in the third embodiment is executed.

According to this embodiment, since a steep peak due to a spectral characteristic of a toner and that of a light source of a spectrocolorimeter is recorded in a recording unit included in an expendable of an image forming apparatus, the image forming apparatus can cope with a change in color tone of a toner caused by a toner of a different lot or due to a change of a color material.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-176332, filed Aug. 11, 2011, which is hereby incorporated by reference herein in its entirety.

What is claimed is:

1. A spectrocolorimeter comprising:
a light source configured to irradiate an object to be measured with colorimetry light;
a spectral unit configured to spectrally separate reflected light from the object to be measured;
a light detection unit having a plurality of pixels configured to receive dispersing light rays spectrally separated by said spectral unit, and to output signals according to intensities of the dispersing light rays; and
a calculation unit configured to calculate wavelengths of the dispersing light rays respectively received by the plurality of pixels included in said light detection unit using a correspondence relationship between pixels and wavelengths of a plurality of extremal value points in a profile of dispersing light rays detected by said light detection unit upon execution of colorimetry of a reference object to be measured,
wherein when said calculation unit calculates the wavelengths of the dispersing light rays respectively received by the plurality of pixels, said calculation unit adjusts a colorimetry condition for respective extremal value points so that signals to be output from pixels corresponding to the plurality of extremal value points have output levels which are not less than a reference and are not saturated.

2. The spectrocolorimeter according to claim 1, wherein the colorimetry condition to be adjusted for respective extremal value points is a light amount of the colorimetry light emitted by said light source.

3. The spectrocolorimeter according to claim 1, wherein the colorimetry condition to be adjusted for respective extremal value points is an accumulation time period in which said light detection unit receives light.

4. The spectrocolorimeter according to claim 1, wherein at least one of the plurality of extremal value points is a local maximum value in the profile of the dispersing light rays.

5. The spectrocolorimeter according to claim 1, wherein at least one of the plurality of extremal value points is a local minimum value in the profile of the dispersing light rays.

6. An image forming apparatus which comprises the spectrocolorimeter of claim 1 and forms an image on a printing medium, said apparatus comprising:
a correction unit configured to correct a correspondence relationship between the plurality of pixels and wavelengths, which are calculated by the calculation unit of said spectrocolorimeter for the image formed on the printing medium, using a correspondence relationship between wavelengths and pixels in a reference profile of dispersing light.

7. An image forming apparatus which forms an image on a printing medium using a color material, comprising:
a light source configured to irradiate an object to be measured with colorimetry light;
a spectral unit configured to spectrally separate reflected light from the object to be measured;
a light detection unit having a plurality of pixels configured to receive dispersing light rays spectrally separated by said spectral unit, and to output signals according to intensities of the dispersing light rays; and
a correction unit configured to correct a correspondence relationship between the pixels and the wavelengths of the dispersing light rays received by said light detection unit using a correspondence relationship between wavelengths and pixels in a profile of dispersing light rays detected by said light detection unit upon execution of colorimetry of a reference object to be measured, and a correspondence relationship between pixels and wavelengths of dispersing light rays of the image formed on the printing medium.

8. The apparatus according to claim 7, further comprising:
a storage unit configured to store wavelength information of dispersing light rays of an image of the color material formed on the printing medium,
wherein said correction unit corrects the correspondence relationship between positions of the pixels and the wavelengths of the dispersing light rays received by said light detection unit based on a relationship between the wavelength information for the image of the color material stored in said storage unit, and wavelengths of dispersing light rays of the image of the color material formed on the printing medium, which are detected by said light detection unit at a correction timing.

9. The apparatus according to claim 8, wherein the profile of the dispersing light rays includes wavelength information of dispersing light rays of the printing medium used as a reference, and
said correction unit corrects the correspondence relationship between the positions of the pixels and the wavelengths of the dispersing light rays received by said light detection unit based on a relationship among the wavelength information for the image of the color material stored in said storage unit, the wavelength information for the printing medium, and wavelengths of dispersing light rays of the image of the color material formed on the printing medium and the dispersing light rays of the printing medium, which are detected by said light detection unit at a correction timing.

10. The apparatus according to claim 8, wherein an expendable which is used in said image forming apparatus and provides the color material comprises said storage unit which stores the wavelength information of the dispersing light rays for the image of the color material.

11. The apparatus according to claim 8, wherein a color of the color material is one of cyan, yellow, magenta, red, green, and blue.

12. The apparatus according to claim 7, wherein light irradiated by said light source is white light.

13. The apparatus according to claim 7, wherein the image of the color material is a high-density pattern of a single color having a coverage rate of 100% or nearly 100%.

14. A spectrocolorimeter comprising:
a light source configured to irradiate an object to be measured with light;
a spectral unit configured to spectrally separate reflected light from the object to be measured;
a light detection unit having a plurality of pixels configured to receive dispersing light rays spectrally separated by said spectral unit, and to output signals according to intensities of the dispersing light rays; and
a calculation unit configured to calculate wavelengths of the dispersing light rays respectively received by the plurality of pixels included in said light detection unit using a correspondence relationship between a pixel and a wavelength of an extremal value point in a profile of dispersing light rays detected by said light detection unit upon execution of colorimetry of a reference object to be measured,
wherein, in order to calculate the wavelengths of the dispersing light rays respectively received by the plurality of pixels, said calculation unit adjusts a colorimetry condition so that a signal to be output from a pixel corresponding to the extremal value point becomes larger.

15. The spectrocolorimeter according to claim 14, wherein there exists a plurality of extremal value points,
wherein said calculation unit adjusts a colorimetry condition so that signals to be output from pixels corresponding to the plurality of extremal value points become larger.

16. The spectrocolorimeter according to claim 14, wherein said calculation unit adjusts the colorimetry condition so that the signal to be output from the pixel corresponding to the extremal value point has output level which is not less than a reference and is not saturated.

17. The spectrocolorimeter according to claim 14, wherein the colorimetry condition is a light amount of the light emitted by said light source.

18. The spectrocolorimeter according to claim 14, wherein the colorimetry condition is an accumulation time period in which said light detection unit receives light.

19. The spectrocolorimeter according to claim 14, wherein the extremal value point is a local maximum value in the profile of the dispersing light rays.

20. The spectrocolorimeter according to claim 14, wherein the extremal value point is a local minimum value in the profile of the dispersing light rays.

21. An image forming apparatus which forms an image on a printing medium, the image forming apparatus comprising the spectrocolorimeter of claim 14.

22. The image forming apparatus according to claim 21, further comprising:
a correction unit configured to correct a correspondence relationship between the plurality of pixels and wavelengths, which are calculated by the calculation unit of said spectrocolorimeter for the image formed on the printing medium, using a correspondence relationship between wavelengths and pixels in a reference profile of dispersing light.

23. An image forming apparatus which forms an image on a printing medium, the image forming apparatus comprising the spectrocolorimeter of claim 1.

* * * * *